United States Patent [19]
Hasegawa et al.

[11] Patent Number: 5,945,811
[45] Date of Patent: Aug. 31, 1999

[54] PULSE CHARGING METHOD AND A CHARGER

[75] Inventors: Hirokazu Hasegawa, Fujisawa; Yasutaka Iwao, Chigasaki; Keita Matsuda, Kamakura; Akihide Konno, Chigasaki, all of Japan

[73] Assignee: Matsushita Electric Industrial Co., Ltd., Osaka, Japan

[21] Appl. No.: 09/000,007

[22] PCT Filed: May 21, 1997

[86] PCT No.: PCT/JP97/01721

§ 371 Date: Jan. 21, 1998

§ 102(e) Date: Jan. 21, 1998

[87] PCT Pub. No.: WO97/44878

PCT Pub. Date: Nov. 27, 1997

[30] Foreign Application Priority Data

| May 21, 1996 | [JP] | Japan | 8-148539 |
| May 21, 1996 | [JP] | Japan | 8-148540 |
| May 21, 1996 | [JP] | Japan | 8-148541 |
| May 21, 1996 | [JP] | Japan | 8-148542 |
| May 21, 1996 | [JP] | Japan | 8-148543 |
| Mar. 13, 1997 | [JP] | Japan | 9-58940 |

[51] Int. Cl.⁶ .................................................. H02J 7/00
[52] U.S. Cl. ........................................ 320/141; 320/145
[58] Field of Search ............................. 320/139, 141, 320/145, 157, 162

[56] References Cited

U.S. PATENT DOCUMENTS

| 5,289,101 | 2/1994 | Furuta et al. | 320/145 |
| 5,304,917 | 4/1994 | Somerville | 320/148 |
| 5,412,306 | 5/1995 | Meadows et al. | 320/139 |
| 5,432,429 | 7/1995 | Armstrong, II et al. | 320/136 |
| 5,523,671 | 6/1996 | Stewart | 320/152 |
| 5,617,007 | 4/1997 | Keidl et al. | 320/141 |
| 5,747,969 | 5/1998 | Tamai | 320/141 |
| 5,828,202 | 10/1998 | Tamai | 320/141 |
| 5,838,141 | 11/1998 | Sengupta et al. | 320/145 |

FOREIGN PATENT DOCUMENTS

| 1-91626 | 4/1989 | Japan . |
| 3-117333 | 5/1991 | Japan . |
| 7-123604 | 5/1995 | Japan . |
| 7-240235 | 9/1995 | Japan . |
| 7-270503 | 10/1995 | Japan . |
| 8-103032 | 4/1996 | Japan . |
| 8-116627 | 5/1996 | Japan . |
| 8-182215 | 7/1996 | Japan . |
| 8-241735 | 9/1996 | Japan . |
| 9-7641 | 1/1997 | Japan . |
| 9-149560 | 6/1997 | Japan . |

OTHER PUBLICATIONS

Japanese Search Report corresonding to PCT/JP97/01721 dated Aug. 19, 1997.
English translation of Form PCT/ISA/210.

Primary Examiner—Peter S. Wong
Assistant Examiner—Gregory J. Toatley, Jr.
Attorney, Agent, or Firm—Ratner & Prestia

[57] ABSTRACT

The present invention relates to a pulse charging method and charging system for use with non-aqueous secondary batteries, employing a pulse charge controlling method all the way from the start to the end of charging. This pulse charging method has an on-duty ratio of pulses in a next specified charge period reduced when an average battery voltage has exceeded a charge control voltage during a specified charge period, has an on-duty ratio of pulses in a next specified charge period increased when the average battery voltage has not exceeded the charge control voltage and has the pulse charging ended when an on-duty ratio of pulses has reached a specified value. The pulse charging system comprises an on-duty ratio reducing means for having an on-duty ratio of pulses reduced, an on-duty ratio increasing means for having an on-duty ratio increased and a means for determining pulse charge ending for having the pulse charging ended when an on-duty ratio of pulses has reached a specified value. Thus, it has become possible to provide a charging system that can be built in a battery pack, is inexpensive, free of heat generation and, in addition, allows the charging time to be reduced.

16 Claims, 22 Drawing Sheets

PULSE CHARGING METHOD AND A CHARGER

This application is a U.S. national phase application of PCT international application PCT/JP97/01721.

FIELD OF THE INVENTION

The present invention relates to a pulse charging method and charging system for secondary batteries and particularly relates to a pulse charging method and charging system for use with non-aqueous secondary batteries such as lithium ion batteries and the like that prevent semiconductors (FET) from generating heat and enable containment in a pack.

BACKGROUND OF THE INVENTION

As a charging system for non-aqueous secondary batteries, the system as described in FIG. 24 has been so far widely known. According to the system, a DC voltage Vin outputted from an AC adapter 30 is supplied to portable equipment 20, wherein the DC voltage is fed to a charging DC/DC converter that performs as a constant-voltage and constant-current power supply and charges non-aqueous secondary batteries in a battery pack 10 by supplying a charging current I CHG.

A battery voltage V Batt of the non-aqueous secondary batteries in the battery pack 10 is built up by charging according to the characteristic curve as shown in FIG. 25. More specifically, a constant-current charging takes place until the battery voltage V Batt reaches usually a constant battery control voltage Vc, and after the battery voltage V Batt has reached the battery control voltage Vc in value constant-voltage charging takes over so that the battery voltage V Batt may not exceed the battery control voltage Vc. Once the constant-voltage charging has started, the charging current I CHG starts declining. This declining status is detected by a current detecting means and when the charging current has reached a specified value the output of the DC/DC converter is shut off by a control means and the charging operation is ended. Thus the charging of non-aqueous secondary batteries has been so far performed.

The prior art charging system for non-aqueous secondary batteries, however, requires a charging DC/DC converter that is able to output a high accuracy charge control voltage Vc, resulting in a problem of ending up with high costs.

Instead of using the foregoing charging DC/DC converter, use of a dropper type constant-voltage control circuit is proposed to reduce the high costs of the above system, but a large amount of heat generated from the dropper type constant-voltage control circuit has presented another problem.

Furthermore, in the case wherein a charge control is conducted inside of a battery pack, it is impossible for the foregoing charging DC/DC converter to be built in a battery pack from the points of both costs and dimensions (components count) and it is impossible again for the dropper type constant-voltage control circuit to be contained inside of a battery pack when adverse effects imposed on the batteries and other electronic components by the large amount of heat generated from the dropper type circuit are considered, thereby presenting still another problem.

The present invention deals with the foregoing problems that have been so far existing and the object thereof is to provide a pulse charging method and charging system for non-aqueous secondary batteries that are inexpensive, no heat generating and capable of reducing a charge time. The present invention also aims at providing a pulse charging method for non-aqueous secondary batteries that allows a charging system to be built in a battery pack.

DISCLOSURE OF THE INVENTION

The pulse charging method of the present invention for accomplishing the foregoing object is a pulse charging method wherein charging is performed by determining an on-duty ratio of pulses for a next specified charge period during a specified charge period after the start of charging, having the on-duty ratio of pulses for the next specified charge period reduced when an average battery voltage has exceeded a charge control voltage during the specified charge period, having the on-duty ratio of pulses for the next specified charge period increased when the average battery voltage has not exceeded the charge control voltage during the specified charge period and having the pulse charging ended when the on-duty ratio of pulses has reached a specified value in the next specified charge period.

A charging system of the present invention for realizing the foregoing pulse charging method comprises a duty ratio reducing means for having an on-duty ratio of pulses for a next specified charge period reduced when an average battery voltage has exceeded a charge control voltage during a specified charge period, a duty ratio increasing means for having an on-duty ratio of pulses for a next specified charge period increased when an average battery voltage has not exceeded a charge control voltage during a specified charge period and a means for determining pulse charge ending for having the pulse charging ended when an on-duty ratio of pulses has reached a specified value in a next specified charge period.

Thus, a pulse charging method is employed all the way from the start of charging in the pulse charging method of the present invention and, therefore, charging at low cost, without heat generation and with a shortened charge period is made possible.

Further, a pulse charging system in another exemplary embodiment of the present invention that employs the foregoing pulse charging method is a pulse charging system that performs charging the same way as the foregoing charging system wherein charging is performed by determining an on-duty ratio of pulses for a next specified charge period during a specified charge period after the start of charging and comprises a switching means for turning on/off a charge current, a battery voltage detecting means whereby a voltage of each respective battery cell is detected, and a pulse charge control means for handling the overall control of pulse charging, which further comprises a control means for performing a control function over each respective means as described below, a reference voltage generating means for generating a reference voltage that serves as a charge control voltage according to the control means, a voltage comparing means whereby a battery voltage produced by accumulating each respective cell voltage obtained from the foregoing battery voltage detecting means is memorized, an average battery voltage is obtained from an average value derived by calculation from the battery voltages that have been memorized during a specified period and this average battery voltage is compared with the foregoing reference voltage, a periodic timer setting means for setting up a charge period, a duty timer setting means for setting up a duty time that is determined by the product of a specified charge period and a duty ratio and a latching means for latching that the average battery voltage has exceeded the charge control voltage as a result of voltage comparison in the foregoing voltage comparing means.

It is also possible for a pulse charging system of the present invention to eliminate the foregoing latching means. More specifically, a pulse charging system, wherein charging is performed by a pulse duty charging method characterized by ending the pulse charging when an on-duty ratio of pulses has reached a specified ratio, comprises in the same way as the foregoing pulse charging system a switching means for turning on/off a charge current, a battery voltage detecting means whereby a voltage of each respective battery cell is detected and a pulse charge control means for handling the overall control of pulse charging, the pulse charge control means further comprising a control means for performing a control function over each respective means as described below, a reference voltage generating means for generating a reference voltage that serves as a charge control voltage according to the foregoing control means, a voltage comparing means whereby a battery voltage produced by accumulating each respective cell voltage obtained from the foregoing battery voltage detecting means is memorized, an average battery voltage is obtained from an average value derived by calculation from the battery voltages that have been memorized during a specified period and this average battery voltage is compared with the foregoing reference voltage, a periodic timer setting means for setting up a specified charge period and a duty timer setting means for setting up a duty time that is determined by the product of a specified charge period and a duty ratio. The foregoing pulse charge control means is characterized by performing a voltage comparison by the foregoing voltage comparing means according to an excessive lapse of the foregoing duty time set up in the foregoing duty timer setting means.

According to the foregoing structure, the pulse charge control means performs a voltage comparison by the voltage comparing means according to an excessive lapse of the duty time set up in the duty timer setting means and, therefore, the latching means can be eliminated from the pulse charge control means, thereby contributing to a cost reduction.

Furthermore, the present invention discloses a pulse charging system which, in addition to the charging control whereby charging is performed by setting up an on-duty ratio of pulses for a next specified charge period during a specified charge period after the start of charging and the pulse charging is ended when the on-duty ratio of pulses has reached a specified ratio, practices a pulse charging method with a function of deciding the on-duty ratio of pulses with the temperature data from a temperature detecting means for detecting battery temperatures reflected in the charge control. This pulse charging system comprises a voltage detecting means for detecting each respective cell voltage, a temperature detecting means for detecting battery temperatures by measuring each respective cell temperature, a maximum duty ratio setting means whereby a maximum duty ratio is set to a value obtained by dividing a first specified average current derived from the foregoing voltage detecting means and temperature detecting means by the charge current of the time when the charge current exceeds the first specified average current, a duty ratio reducing means for having an on-duty ratio of pulses during a next specified charge period reduced when the average battery voltage has exceeded the charge control voltage during a specified charge period, a duty ratio increasing means for having an on duty ratio of pulses during a next charge period increased when the average battery voltage has not exceeded the charge control voltage during a specified charge period and a means for determining pulse charge ending for having the pulse charging ended when the average current during a next specified charge has not reached a second average current that is smaller than the foregoing first specified average current.

In addition to the foregoing pulse charging method for performing a charge control according to battery temperatures, another embodiment of the present invention makes it possible that charging circuit resistance at the time of charging is obtained by calculation and this resistance value is used in the pulse charge control. Accordingly, the present invention allows a pulse charging method for performing charging by setting up an on-duty ratio of pulses for a next specified charge period during a specified charge period after the start of charging to comprise a means for finding charge circuit resistance whereby charge circuit resistance is obtained from a difference in voltage between the voltage observed during charging and the voltage at the end of charging and a charge current, a means for adjusting charge control voltage whereby an adjustment of charge control voltage is made by adding to a fixed charge control voltage, the product of charge circuit resistance obtained from the foregoing means for finding charge circuit resistance, a charge current, an on-duty ratio of pulses and a safety factor which is a constant determined according to the measurement accuracy of charge circuit resistance, ranging from 0 to 1, a duty ratio reducing means for having an on-duty ratio of pulses in a next specified charge period reduced when the average battery voltage has exceeded the adjusted charge control voltage during a specified charge period, a duty ratio increasing means for having an on-duty ratio of pulses in a next specified charge period increased when the average battery voltage has not exceeded the adjusted charge control voltage during a specified charge period and a means for determining pulse charge ending for having the pulse charging ended when an on-duty ratio of pulses in a next specified charge period has reached a specified value.

The structure as described in the above is allowed to have the effect of shortening charge time by adding a voltage value determined from charge circuit resistance and a charge current to an ordinary charge control voltage.

On the other hand, a pulse charging method of the present invention performs a charge control by changing a charge period of pulses instead of changing an on-duty ratio of pulses as adopted in the foregoing pulse charging method. This pulse charging method is a method, whereby charging is performed with a next specified charge pulse period determined during a specified charge period after the start of charging and when an average battery voltage has exceeded a charge control voltage during a specified charge pulse period, a next specified charge pulse period is made to increase, when an average battery voltage has not exceeded the charge control voltage a next specified charge pulse period is made to hold or decrease and when a next specified pulse charge period has exceeded a specified value the pulse charging is made to come to an end.

The pulse charging system, wherein a pulse charge period is changed, comprises a charge pulse period increasing means for having a next specified charge pulse period increased when an average battery voltage has exceeded a charge control voltage, a charge pulse period reducing means for having a next specified charge pulse period reduced when the average battery voltage has not exceeded the charge control voltage and a means for determining pulse charge ending for having the pulse charging ended when a next specified charge pulse period has exceeded a specified value.

BRIEF DESCRIPTION OF THE DRAWINGS

FIG. 20 is a diagram to show a relationship between a charge control voltage Vcx adjusted by enhancing and a safety factor a.

PREFERRED EMBODIMENTS OF THE INVENTION

Next, preferred embodiments of the present invention will be explained with reference to drawings.

First Exemplary Embodiment

Figure 1:
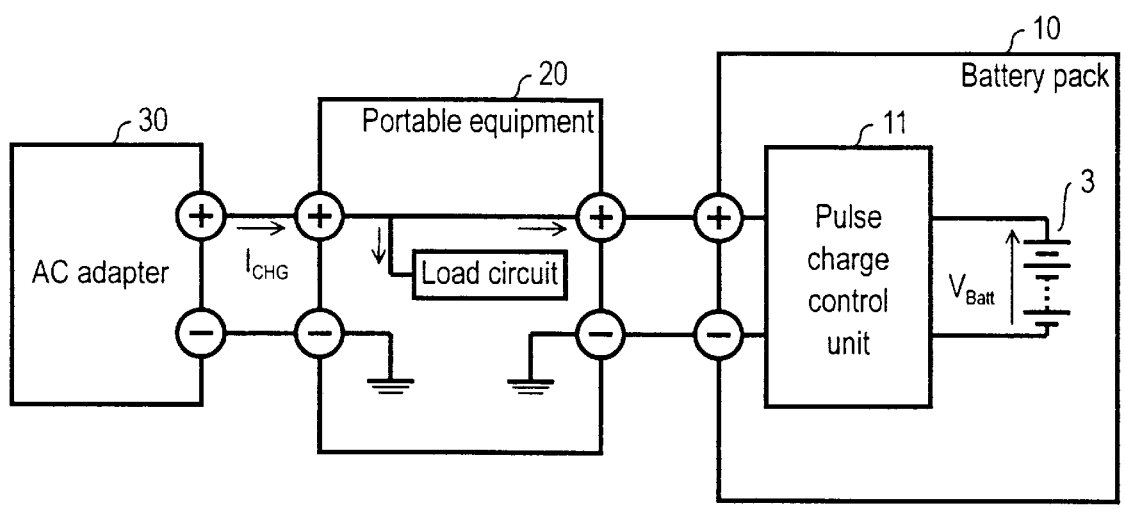
FIG. 1 is a diagrammatic sketch to show how a battery pack that includes a pulse charging system of the present invention is used in electronic equipment.

FIG. 1 is a diagrammatic sketch to show how a battery pack 10 that includes a pulse charging system of the present invention is used in electronic equipment. In FIG. 1, charging takes place in a pulse charge control unit 11 inside of the battery pack 10. An AG adapter 30 in FIG. 1 has stabilized performance as a power supply for charging and has capabilities of feeding a constant current of charge current I CHG.

Figure 2:
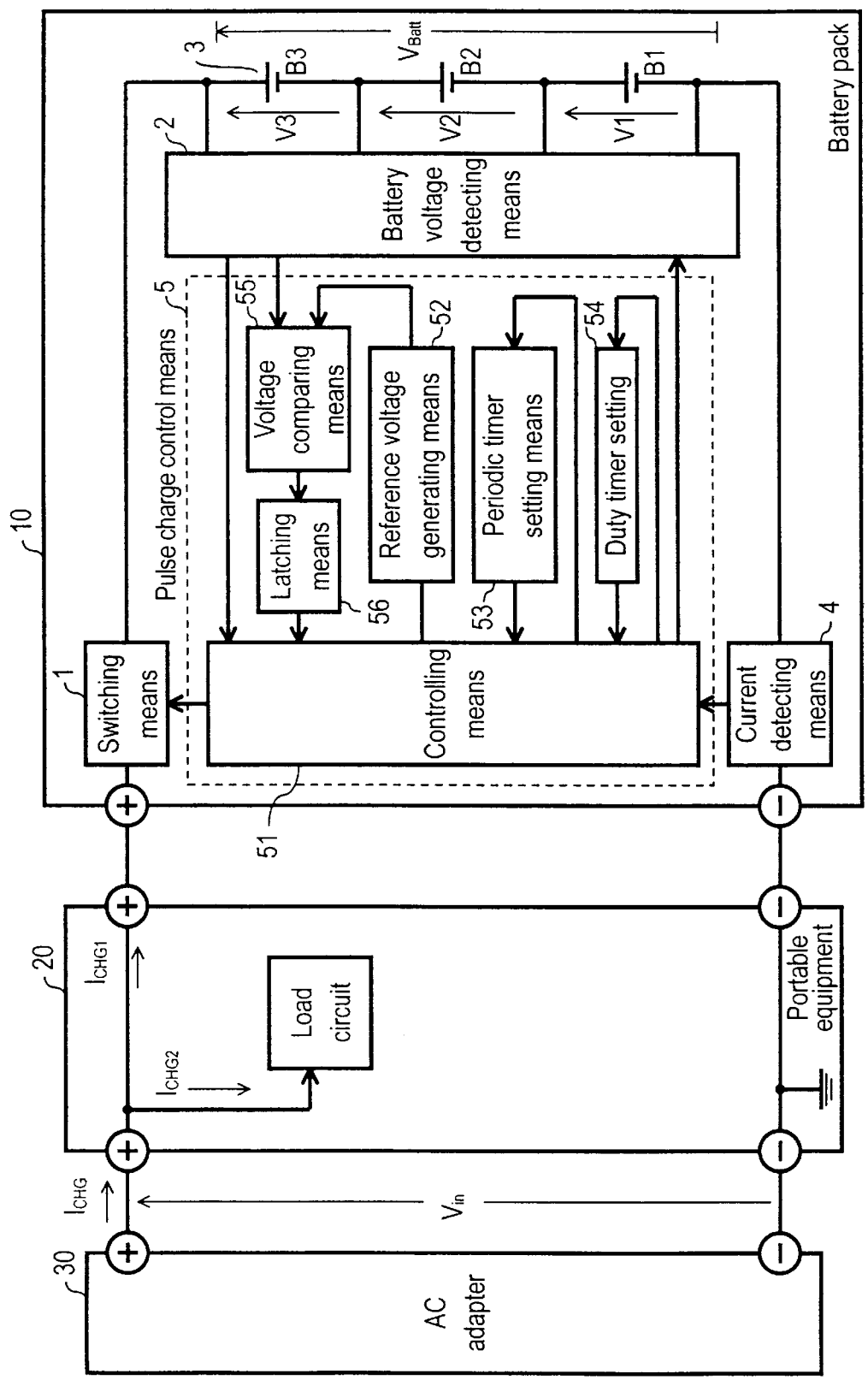
FIG. 2 is a block diagram including details of a pulse charging system in a first exemplary embodiment of the present invention.

FIG. 2 is a block diagram including details of the pulse charging system in the first exemplary embodiment of the present invention. As shown in FIG. 2, the pulse charge control unit of FIG. 1 comprises a switching means 1 for turning on/off a charge current, a battery voltage detecting means 2 for detecting a voltage of each respective battery cell, a current detecting means 4 for detecting the charge current, thereby performing detection of the connection of the AG adapter 30 and a pulse charge control means 5 whereby an overall control of the pulse charging is handled. The pulse charge control means 5 further comprises a control means 51 for controlling each respective means that is described below, a reference voltage generating means 52 for generating a reference voltage that serves as a charge control voltage according to the controlling of the control means 51, a periodic timer setting means 53 for fixing a charging period, a duty timer setting means 54 for setting up a duty time that is determined by the product of a specified charging period and a duty ratio, a voltage comparing means 55 wherein a battery voltage V Batt produced by accumulating each respective cell voltage obtained from the foregoing battery voltage detecting means 2 is memorized, an average battery voltage $\overline{VBatt}$ is obtained from an average value derived by calculation from the battery voltages that have been memorized during a specified period covering the present time and the time dating back to the past and the average battery voltage thus obtained is compared with the foregoing reference voltage of the reference voltage generating means 52, and a latching means 56 for latching that the average battery voltage $\overline{VBatt}$ has exceeded the charge control voltage as a result of the voltage comparison in the foregoing voltage comparing means 55. The realization of these various means as described in the above is made possible by the use of microcomputers.

Figure 3:
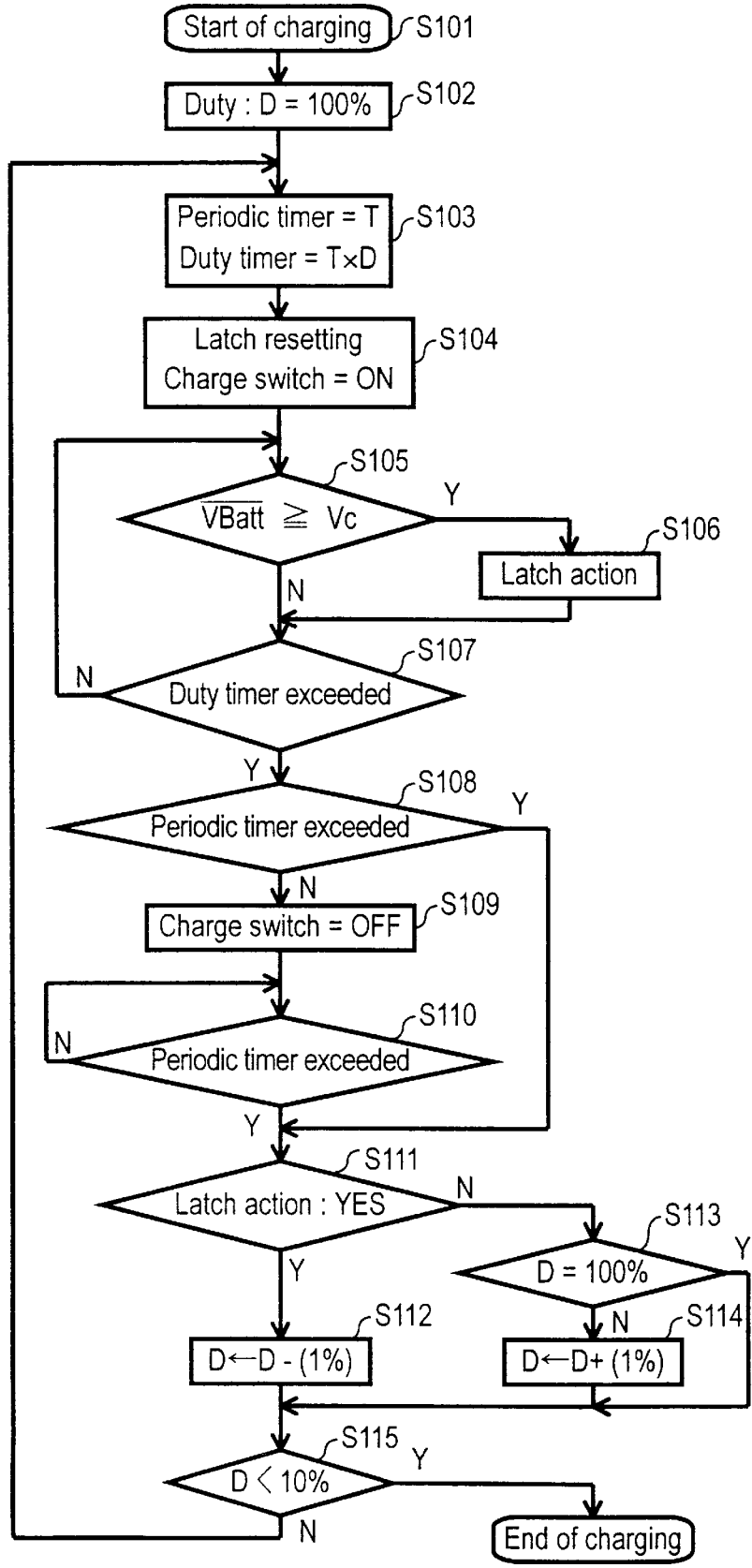
FIG. 3 is a flow chart for explaining the charging operation of the pulse charging system in the first exemplary embodiment of the present invention.

FIG. 3 is a flow chart for explaining the charging operation of the pulse charging system in the first exemplary embodiment of the present invention. When an instruction for the start of charging is given in Step 101, an on-duty ratio D is set to 100% for the starting point in Step 102. Then, in Step 103, a periodic timer T and a duty time T×D are set up by the periodic timer setting means 53 and duty timer setting means 54, respectively. It is preferred that an appropriate value between 50 ms and 2 sec is selected as the periodic timer T.

In Step 104, the latch of the latching means 56 is reset and the charge switch of the switching means 1 is turned on. In Step 105, the average battery voltage $\overline{VBatt}$ of a secondary battery is determined whether it exceeds a charge control voltage Vc or not. This is accomplished by adding up each respective cell voltage and deriving an average battery voltage $\overline{VBatt}$ during a specified period by calculation in the battery voltage comparing means 55 and then by comparing this $\overline{VBatt}$ detected by the battery voltage detecting means 2 with the charge control voltage Vc set up in the reference voltage generating means 52. When the $\overline{VBatt}$ is found to exceed the Vc, the latch of the latching means 56 is set in Step 106, thereby proceeding to Step 107. When the $\overline{VBatt}$ does not reach the Vc, processing proceeds directly to Step 107.

In Step 107, a determination is made on whether the duty time T×D is exceeded or not. When the duty time T×D is not exceeded, processing returns to Step 105. When the duty time T×D is exceeded, processing proceeds to Step 108. In Step 108, a determination is made on whether the set periodic timer T is exceeded or not. When the set periodic timer T is not exceeded, processing proceeds to Step 109. When the set periodic timer T is exceeded, processing proceeds to Step 111.

In Step 109, the charge switch of the switching means 1 is set to an OFF position. In Step 110, the Step 110 is repeated until the set periodic timer T is exceeded and once the set periodic timer T is exceeded, processing proceeds to Step 111.

In Step 111, a determination is made on whether the latch of the latching means 56 is set or not. When the latch of the latching means 56 is found to have been set, processing proceeds to Step 112, where the on-duty ratio D of pulses is decremented and processing proceeds to Step 115. When the latch of the latching means 56 is found not to have been set, processing proceeds to Step 113.

In Step 113, a determination is made on whether the on-duty ratio D of pulses is 100% or not. When the D is 100%, processing proceeds to Step 115. When the D is not 100%, processing proceeds to Step 114, where the on-duty ratio D of pulses is incremented and processing proceeds to Step 115.

In Step 115, a determination is made on whether the on-duty ratio D of pulses reaches a specified value (which is 10% in this case) or not. When the on-duty ratio D of pulses is found to have reached the specified value (not inclusive), the charging is ended. However, when the on-duty ratio D of pulses is found not to have reached the specified value, processing returns to Step 103.

Figure 4:
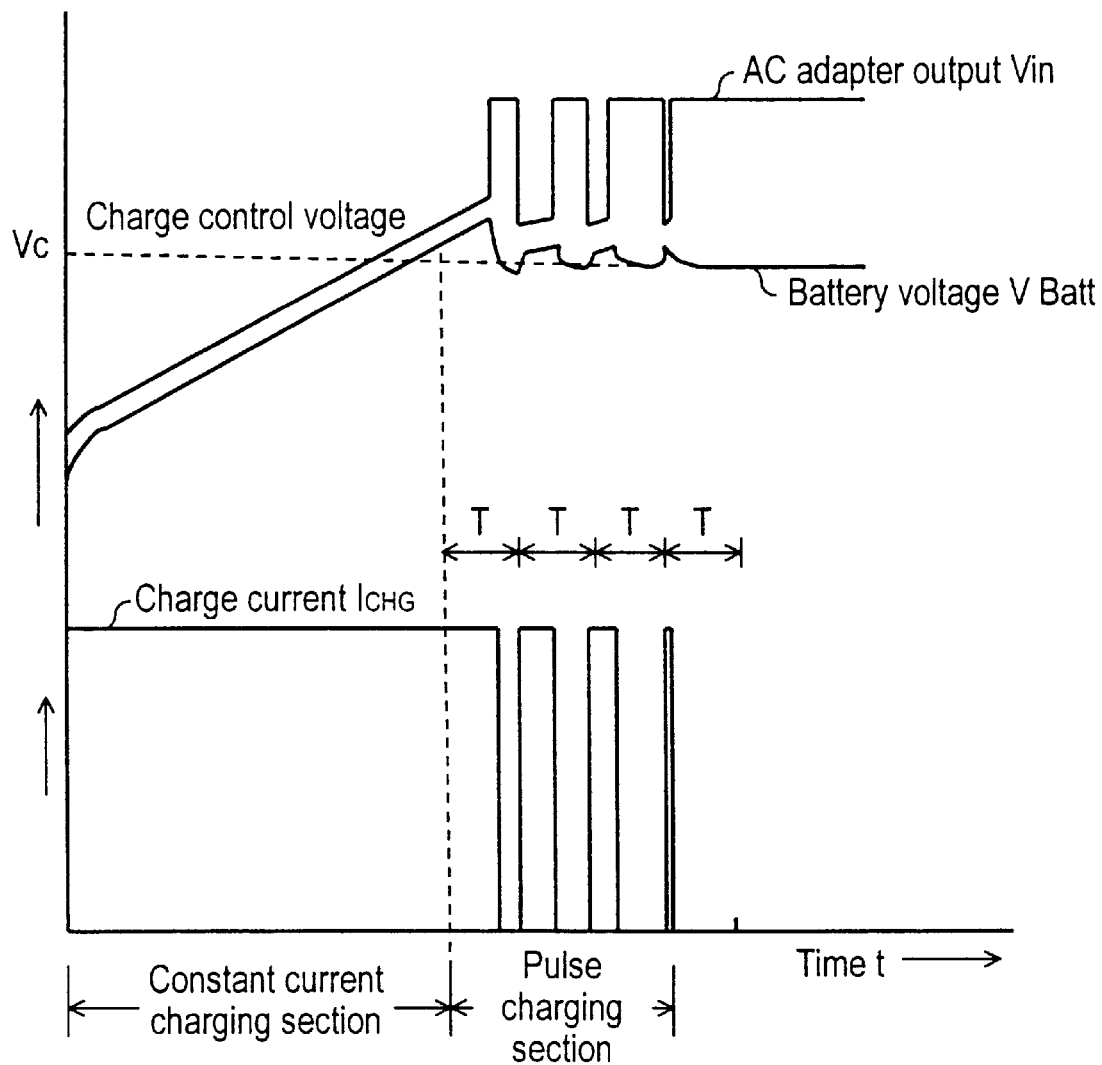
FIG. 4 is a diagram to show the charging operation status of the pulse charging system in the first exemplary embodiment of the present invention.

A charging operation takes place in the first exemplary embodiment of the present invention in such a way as described in the above. FIG. 4 shows the charging operation status at this time. As clearly observed in FIG. 4, the on-duty ratio D of pulses is kept at 100% immediately after start of charging, thereby carrying out a constant-current charging in effect. Further, a decrement of the on-duty ratio D starts at a period T immediately after detecting that the average battery voltage $\overline{VBatt}$ of the secondary battery has exceeded the charge control voltage Vc and charging ends at the time when the on-duty ratio D has reached a specified value not inclusive (10% in this case) due to the decrement of the on-duty ratio D.

Pulse charging takes place in effect during the time period from the start of decrement of the on-duty ratio D to the time when the on-duty ratio D reaches a specified value not inclusive (10% in this case) due to the decrement of the on-duty ratio D. However, it is important to recognize that the charging operation in the first exemplary embodiment of the present invention is of a pulse charging method all the way through from the beginning of charging. Although the decrement or increment of the on-duty ratio D is 1% in the foregoing exemplary embodiment, it is needless to say that this value can be set up arbitrarily. Although the specified value whereby an end of charging is determined is made as 10% in the foregoing exemplary embodiment, this value also can be set up arbitrarily.

Since battery cell voltages usually vary from cell to cell according to the differences in cell capacity and self discharge existing among the battery cells, the voltages of cells with smaller capacity tend to become higher at the time of charging. Therefore, the pulse charge control means 5 controls the battery voltage detecting means 2 so as to detect the voltage of each respective battery cell periodically and the pulse charge control is performed by using as a reference the highest voltage among the battery cell voltages detected by the battery voltage detecting means 2. Thus, an over charge of each respective battery cell can be prevented with reliability.

Although an example of having the pulse charge control unit 11 contained in the battery pack 10 is shown in FIG. 1 and FIG. 2, it is needless to say that the pulse charge control unit 11 can be located outside of the battery pack 10 in portable equipment 20, for example.

Second Exemplary Embodiment

Figure 5:
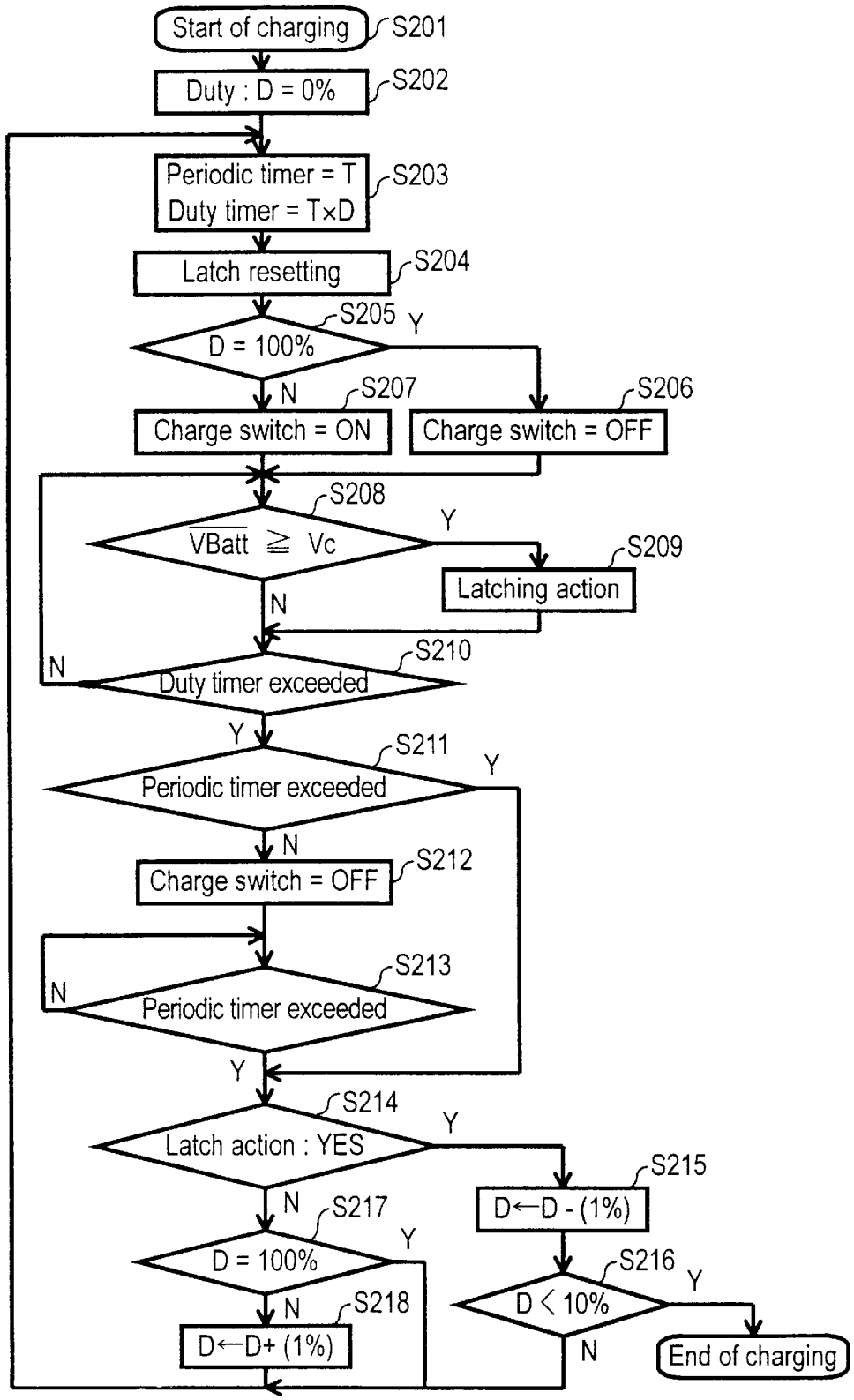
FIG. 5 is a flow chart for explaining the charging operation of a pulse charging system in a second exemplary embodiment of the present invention.

FIG. 5 is a flow chart for explaining the charging operation of a pulse charging system in a second exemplary embodiment of the present invention. The flow chart used in the present exemplary embodiment is characterized by starting with an on-duty ratio of 0%. When an instruction for the start of charging is given at Step 201, the on-duty ratio D of pulses is set to 0% for the time to start charging in Step 202. Then, in Step 203, a periodic timer T and a duty time T×D are set up by the periodic timer setting means 53 and duty timer setting means 54, respectively. It is preferred that an appropriate value between 50 ms and 2 sec is selected as the periodic timer T.

In Step 204, the latch of the latching means 56 is reset. In Step 205, a determination is made on whether the on-duty ratio D of pulses stays at 0% as set up for the time to start charging or not. When the on-duty ratio D of pulses is found to have stayed at 0% as set up for the time to start charging, the charge switch of the switching means 1 is kept at the state of OFF in Step 206. When the on-duty ratio D of pulses is not found to have stayed at 0% as set up for the time to start charging, the charge switch of the switching means 1 is set to the position of ON in Step 207.

In Step 208, a determination is made on whether the average battery voltage $\overline{VBatt}$ of a secondary battery exceeds the charge control voltage Vc or not. This is accomplished by adding up each respective cell voltage and deriving an average battery voltage $\overline{VBatt}$ during a specified period by calculation in the battery voltage comparing means 55 and then by comparing this $\overline{VBatt}$ with the charge control voltage Vc set up in the reference voltage generating means 52. When the $\overline{VBatt}$ is found to exceed the Vc, the latch of the latching means 56 is set in Step 209, thereby processing proceeding to Step 210. When the VBatt does not reach the Vc, processing proceeds directly to Step 210.

In Step 210, a determination is made on whether the duty time T×D is exceeded or not. When the duty time T×D is not exceeded, processing returns to Step 208 again. When the duty time T×D is exceeded, processing proceeds to Step 211. In Step 211, a determination is made on whether the set periodic timer T is exceeded or not. When the set periodic timer T is not exceeded, processing proceeds to Step 212. When the set periodic timer T is exceeded, processing proceeds to Step 214.

In Step 212, the charge switch of the switching means 1 is set to an OFF position and processing proceeds to Step 213. In Step 213, the Step 213 is repeated until the set periodic timer T is exceeded and once the set periodic timer T is exceeded, processing proceeds to Step 214.

In Step 214, a determination is made on whether the latch of the latching means 56 is set or not. When the latch of the latching means 56 is found to have been set, processing proceeds to Step 215, where the on-duty ratio D of pulses is decremented and processing proceeds to Step 216.

In Step 216, a determination is made on whether the on-duty ratio D of pulses reaches a specified value (which is 10% in this case) or not. When the on-duty ratio D of pulses is found to have reached the specified value not inclusive, the charging is ended. However, when the on-duty ratio D of pulses is found not to have reached the specified value, processing returns to Step 203.

In Step 214, when the latch of the latching means 56 is found not to have been set, processing proceeds to Step 217, where a determination is made on whether the on-duty ratio D of pulses is 100% or not. When the D is 100%, processing returns to Step 203 directly. When the D is not 100%, processing proceeds to Step 218, where the on-duty ratio D of pulses is incremented and processing returns to Step 203.

Figure 6A:
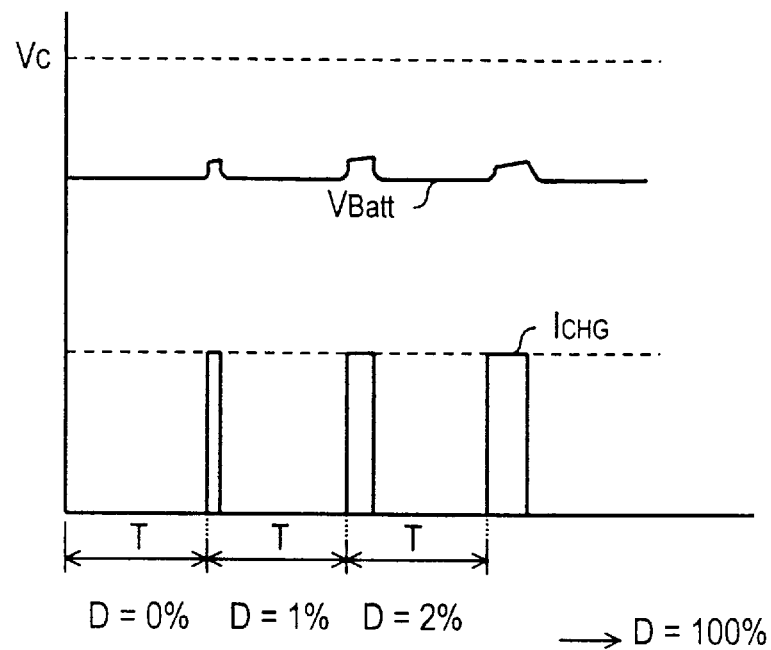
FIG. 6(a) is a diagram to show the charging operation status of the pulse charging system in the second exemplary embodiment of the present invention.
Figure 6B:
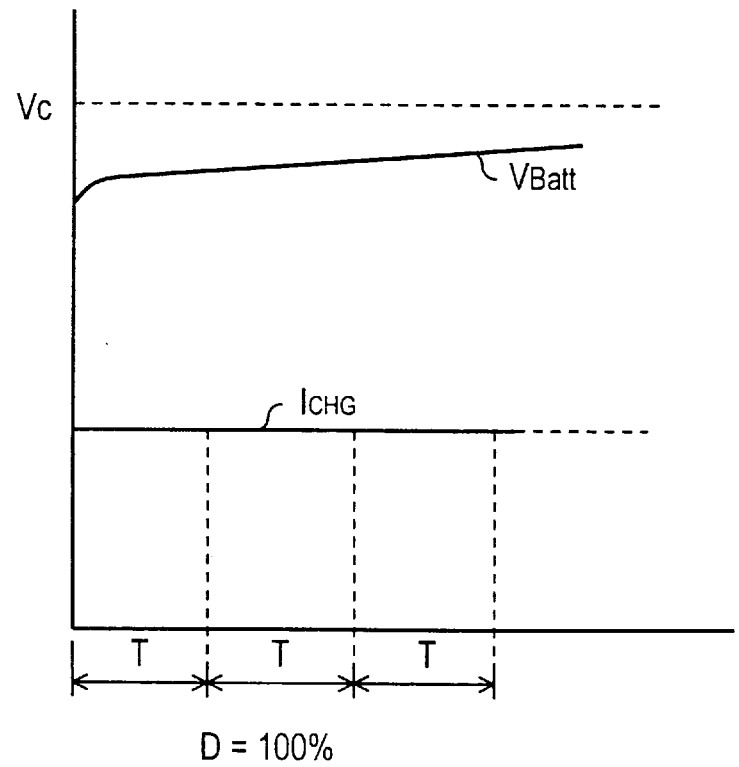
FIG. 6(b) is a diagram to show the charging operation status of the pulse charging system in the first exemplary embodiment of the present invention.

A charging operation takes place in the second exemplary embodiment of the present invention in such a way as described in the above. FIG. 6(a) shows the charging operation status in the above briefly. FIG. 6(b) shows briefly the charging operation status in the foregoing first exemplary embodiment and the on-duty ratio D of pulses starts with 100% immediately after start of charging. On the other hand, since the on-duty ratio D of pulses with the charging method in the second exemplary embodiment of the present invention starts with 0% as clearly observed in FIG. 6(a), the charging operation can be finished faster than that of the charging method in the foregoing first exemplary embodiment when it comes to recharging a battery that has been once finished with charging.

Third Exemplary Embodiment

Figure 7:
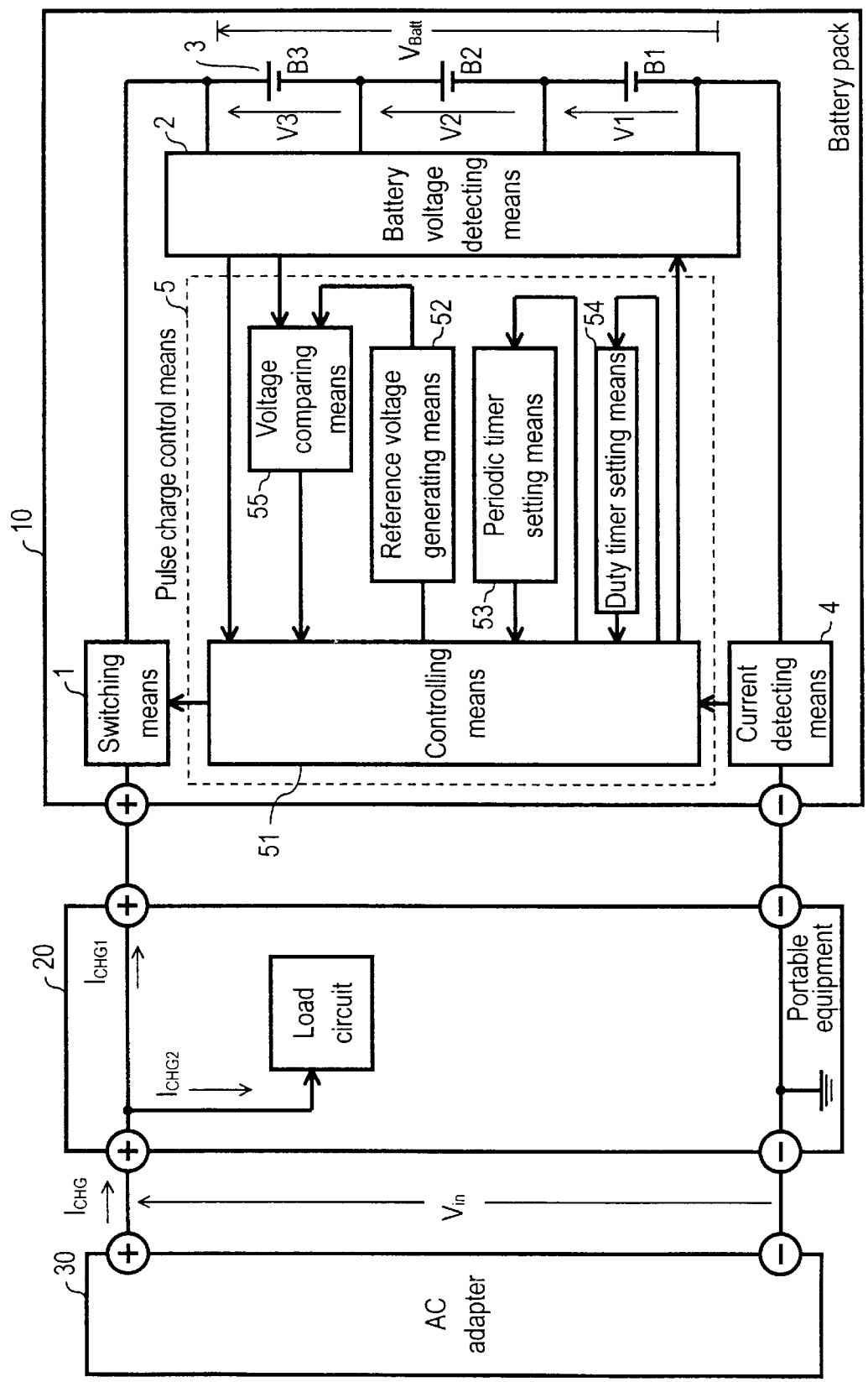
FIG. 7 is a block diagram including details of a pulse charging system in a third exemplary embodiment of the present invention.

FIG. 7 is a block diagram including details of a pulse charging system in a third exemplary embodiment of the present invention, which is characterized by having a latching means eliminated from the pulse charge control means. In FIG. 7, the charging system comprises in the same way as described in FIG. 2 a switching means 1 for turning on/off the charge current, a battery voltage detecting means 2 for detecting a voltage of each respective battery cell, a current detecting means 4 for detecting the charge current, thereby performing detection of the connection of the AC adapter 30 and outputting signals to a control means 51 that will be explained later and a pulse charge control means 5 whereby an overall control of the pulse charging is handled.

The pulse charge control means 5 further comprises a a reference voltage generating means 52 for generating according to the controlling of the control means 51 a charge control voltage that serves as a reference voltage, a periodic timer setting means 53 for determining a specified charging period, a duty timer setting means 54 for setting up a duty time that is determined by the product of a specified charging period and a duty ratio and a voltage comparing means 55 wherein a battery voltage V Batt produced according to each respective cell voltage obtained from the foregoing battery voltage detecting means 2 is calculated and memorized and then an average battery voltage $\overline{VBatt}$ obtained from an average value derived by calculation from the battery voltages $\overline{VBatt}$ during a specified period is compared with the reference voltage from the foregoing reference voltage generating means 52. The realization of these various means as described in the above is made possible by the use of microcomputers. In the present exemplary embodiment, the pulse charge control is performed by comparing the average battery voltage VBatt with the reference voltage after the time set up by the duty time has elapsed.

Figure 8:
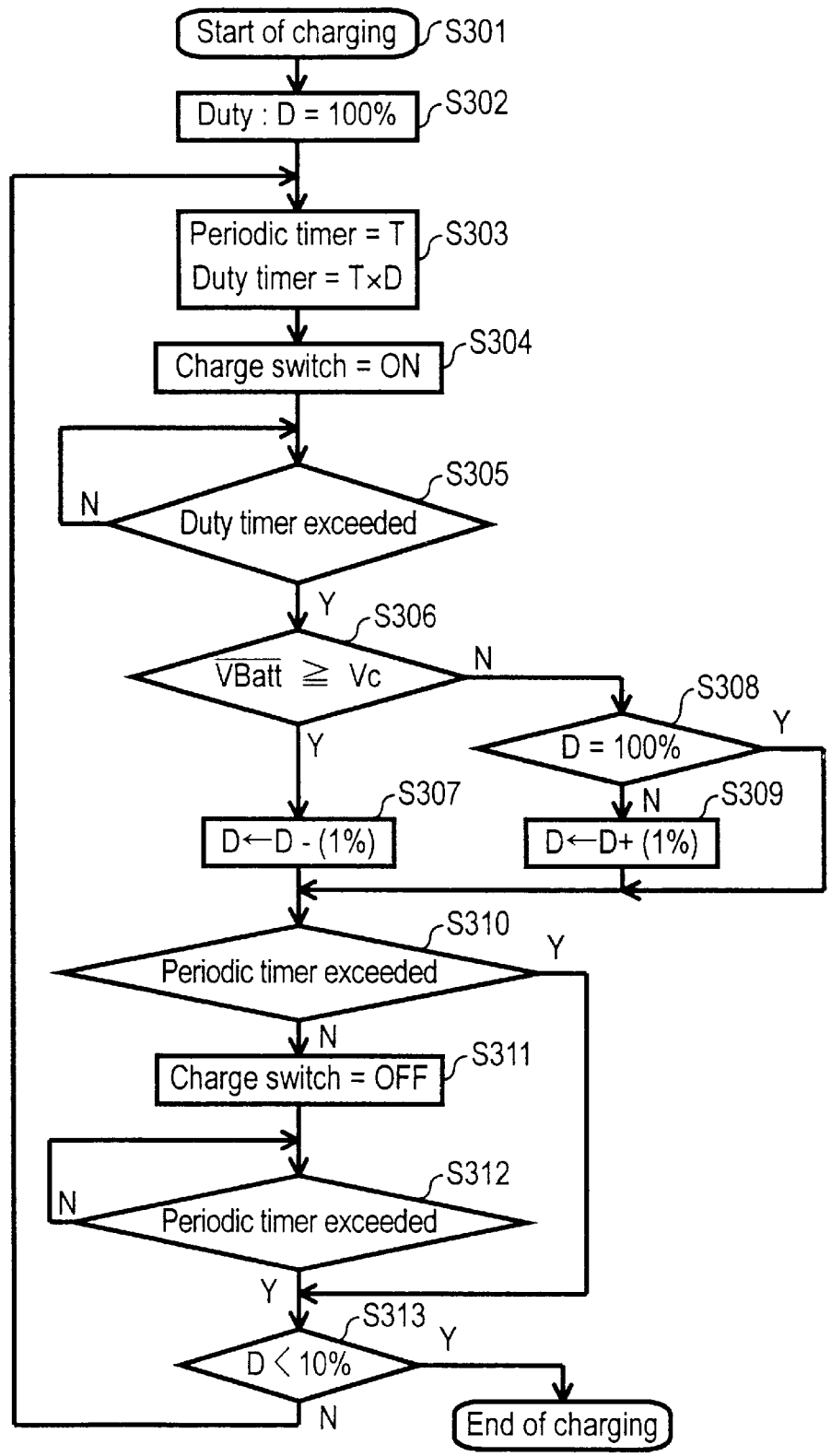
FIG. 8 is a flow chart for explaining the charging operation of the pulse charging system in the third exemplary embodiment of the present invention.

FIG. 8 is a flow chart for explaining the charging operation of the pulse charging system in the third exemplary embodiment of the present invention. When an instruction for the start of charging is given at Step 301, the on-duty ratio D of pulses is set to 100% for the time to start charging in Step 302. Then, in Step 303, a periodic timer T and a duty time T×D determined from periodic timer and duty are set up by the periodic timer setting means 53 and duty timer setting means 54, respectively. It is preferred that an appropriate value between 50 ms and 2 see is selected as the periodic timer T.

In Step 304, the charge switch of the switching means 1 is set to an ON position. In Step 305, the Step 305 is repeated until the set duty time T×D is exceeded.

In Step 306, a determination is made on whether the average battery voltage $\overline{VBatt}$ of a secondary battery exceeds the charge control voltage Vc or not. This is accomplished by adding up each respective cell voltage and deriving an average battery voltage $\overline{VBatt}$ during a specified period by calculation in the battery voltage comparing means 55 and then by comparing this $\overline{VBatt}$ with the charge control voltage Vc set up in the reference voltage generating means 52. When the $\overline{VBatt}$ is found to exceed the Vc, the on-duty ratio D of pulses is decremented in Step 307 and processing proceeds to Step 310. When the $\overline{VBatt}$ does not reach the Vc, processing proceeds to Step 308.

In Step 308, a determination is made on whether the on-duty ratio D of pulses is 100% or not. When the D is 100%, processing proceeds to Step 310. When the D is not 100%, processing proceeds to Step 309 where the on-duty ratio D of pulses is incremented and processing proceeds to Step 310.

In Step 310, a determination is made on whether the set periodic timer T is exceeded or not. When the set periodic timer T is not exceeded, processing proceeds to Step 311. When the set periodic timer T is exceeded, processing proceeds to Step 313.

In Step 311, the charge switch of the switching means 1 is set to an OFF position and processing proceeds to Step 312. In Step 312, the Step 312 is repeated until the periodic timer T has been exceeded and once the periodic timer T is exceeded, processing proceeds to Step 313.

In Step 313, a determination is made on whether the on-duty ratio D of pulses reaches a specified value (which is 10% in this case) or not. When the on-duty ratio D of pulses is found to have reached the specified value not inclusive, the charging is ended. However, when the on-duty ratio D of pulses is found not to have reached the specified value, processing returns to Step 303.

Figure 9:
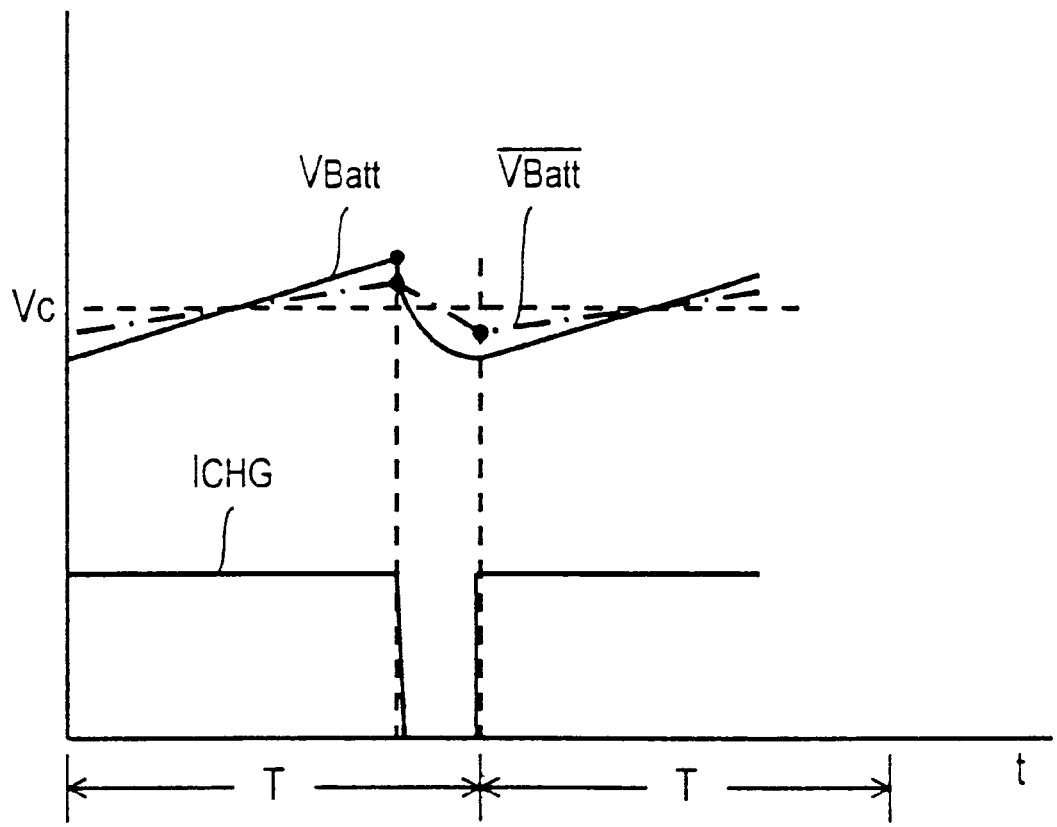
FIG. 9 is a diagram to show voltage detection timing of the pulse charging system in the third exemplary embodiment of the present invention.

A charging operation takes place in the third exemplary embodiment of the present invention in such a way as described in the above. FIG. 9 is a diagram to show voltage detection timing in the present exemplary embodiment. In the pulse charge control means 5, a voltage comparison is performed by the voltage comparing means 55 according to the extent of exceeding over the duty time set in the duty timer setting means 54 as clearly seen in FIG. 9, thereby allowing the pulse charge control means 5 to eliminate a latching means. Furthermore, this results in needing no use of RAM and eliminating a ROM region although both are required to build the latching means in a microcomputer. Meanwhile, a cost reduction is effectively achieved by the disclosed charging system of the present exemplary embodiment even when compared with the case wherein the latching means is formed of a flip-flop circuit instead of a microcomputer.

In the present exemplary embodiment, a decrement or increment of 1% is adopted for the on-duty ratio D but it is needless to say that any arbitrary values can be employed. Furthermore, a specific value of 10% whereby charging operation is ended is employed in the present exemplary embodiment but this value also can be determined arbitrarily.

Fourth Exemplary Embodiment

Figure 10:
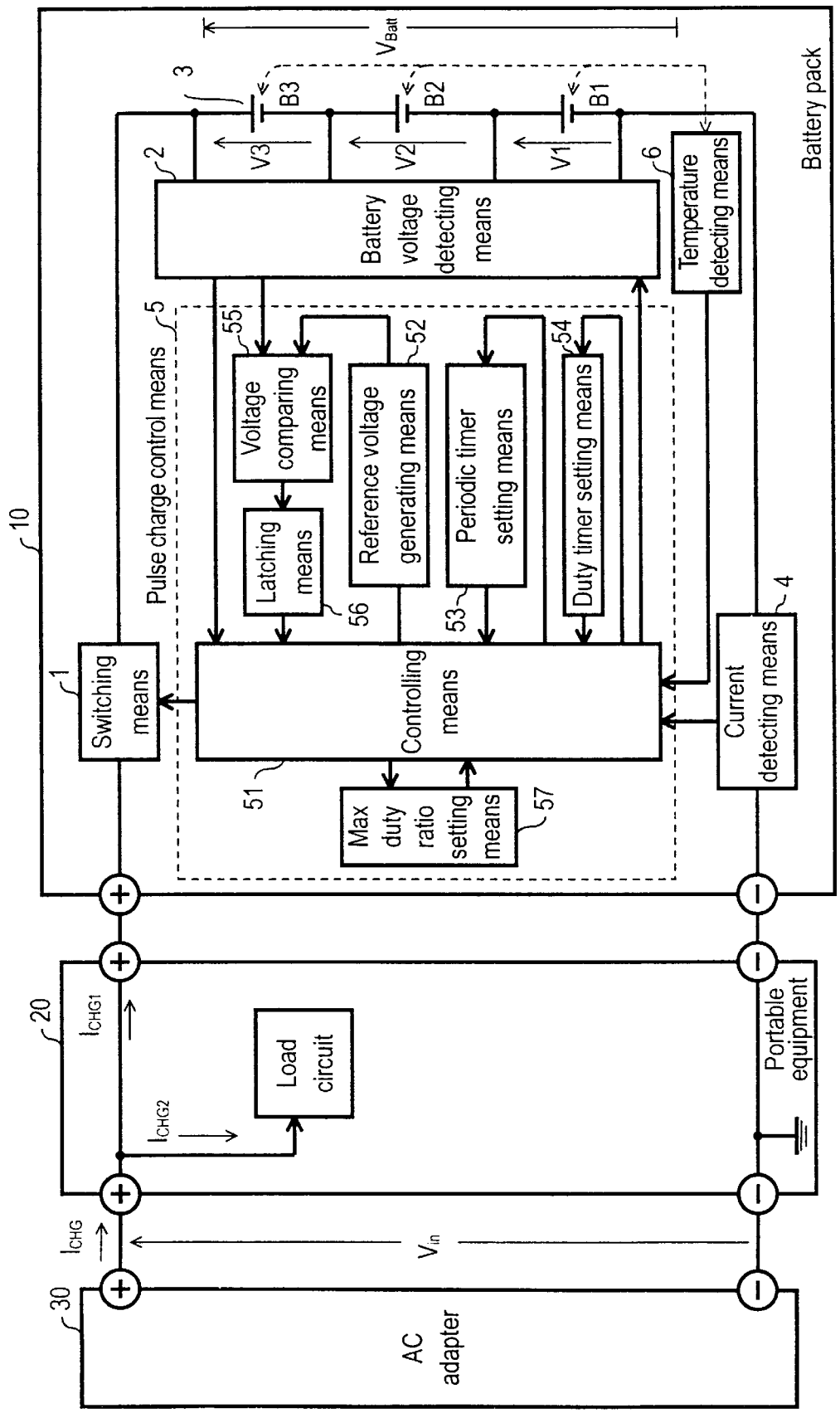
FIG. 10 is a block diagram including details of a pulse charging system in a fourth exemplary embodiment of the present invention.

FIG. 10 is a block diagram including details of a pulse charging system in a fourth exemplary embodiment of the present invention. The pulse charging system in the present exemplary embodiment is the same as the one in the first exemplary embodiment except for having added a temperature detecting means for detecting battery temperatures to the pulse charge control unit and characterized by adding a control according to temperature conditions to the pulse charge control. In FIG. 10, a pulse charge control unit is comparably structured like the ones in the foregoing exemplary embodiments and comprises a switching means 1 for turning on/off the charge current, a battery voltage detecting means 2 for detecting a voltage of each respective battery cell, a current detecting means 4 for detecting the charge current, a pulse charge control means 5 whereby an overall control of the pulse charging is handled and further a temperature detecting means 6 for detecting battery temperatures by detecting a temperature of each respective battery cell.

The pulse charge control means 5 further comprises a control means 51 for controlling each respective means that is described below, a reference voltage generating means 52 for generating according to the controlling of the control means 51 a reference voltage that serves as a charge control voltage, a periodic timer setting means 53 for fixing a charging period, a duty timer setting means 54 for setting up a duty time that is determined by the product of a specified charging period and a duty ratio, a voltage comparing means 55 wherein a battery voltage V Batt produced by accumulating each respective cell voltage obtained from the foregoing battery voltage detecting means 2 is calculated and memorized, an average battery voltage VBatt is obtained from an average value derived by calculation from the battery voltages that have been obtained during a specified period covering the present time and dating back to the past and the average battery voltage thus obtained is compared with the foregoing reference voltage of the reference voltage generating means 52, and a latching means 56 for latching that the battery voltage has exceeded the charge control voltage as a result of the voltage comparison in the foregoing voltage comparing means 55 in the same way as observed in the foregoing exemplary embodiments.

Furthermore, when the charge current exceeds a first specified average current value that is determined according to the foregoing battery voltage detecting means 2 and temperature detecting means 6, the pulse charge control means 5 comprises a maximum duty ratio setting means 57 whereby the first specified average current value is set to the maximum duty ratio that is determined by dividing the first specified average current value with the charge-current then flowing. The realization of these various means as described in the above is made possible by the use of microcomputers as a matter of course.

Figure 11:
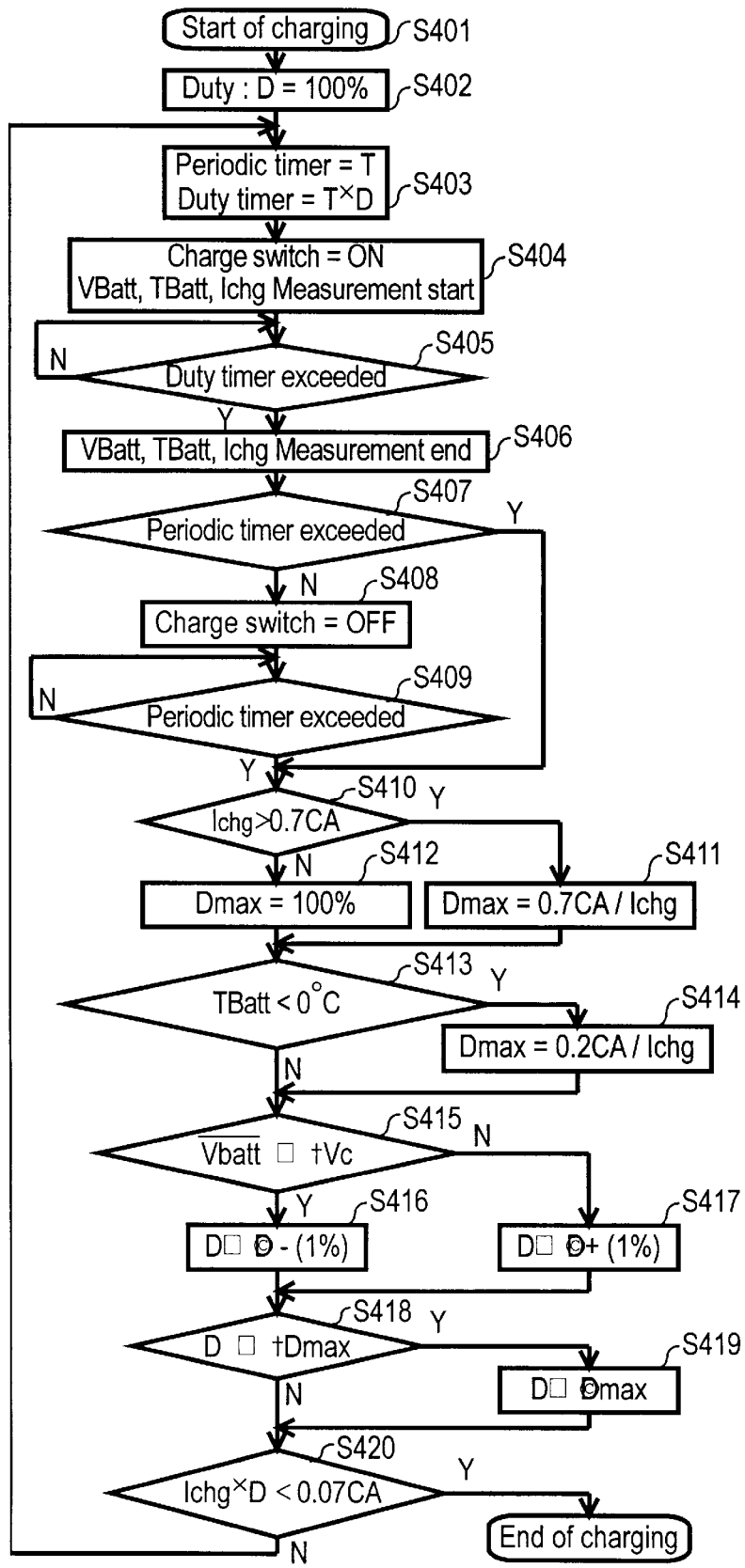
FIG. 11 is a flow chart for explaining the charging operation of the pulse charging system in the fourth exemplary embodiment of the present invention.

FIG. 11 is a flow chart for explaining the charging operation of the pulse charging system in the fourth exemplary embodiment of the present invention. When an instruction for the start of charging is given at Step 401, the on-duty ratio D of pulses is set to 100% for the time to start charging in Step 402. Then, in Step 403, a periodic timer T and a duty time T×D are set up by the periodic timer setting means 53 and duty timer setting means 54, respectively. It is preferred that an appropriate value between 50 ms and 2 sec is selected as the periodic timer T.

In Step 404, the charge-switch of the switching means 1 is set to an ON position and measurements of an average battery voltage $\overline{VBatt}$, battery temperature T Batt and a charge current I CHG are started. At this time, the average battery voltage $\overline{VBatt}$ is obtained by calculation from each respective cell voltage (V1, V2, V3) that is detected by the battery voltage detecting means 2 and accumulated by the voltage comparing means 55, the battery temperature T Batt is measured by the temperature detecting means 6 and the charge current I CHG is measured by the current detecting means 4.

In Step 405, the Step 405 is repeated until the set duty time T×D has been exceeded. When the set duty time T×D is exceeded, processing proceeds to Step 406. When measurements of the battery voltage V Batt, battery temperature T Batt and charge current I CHG are finished in Step 406, processing proceeds to Step 407.

In Step 407, a determination is made on whether the set periodic timer T is exceeded or not. When the set periodic timer T is not exceeded, processing proceeds to Step 408. When the set periodic timer T is exceeded, processing proceeds to Step 410.

In Step 408, the charge switch of the switching means 1 is set to an OFF position. In Step 409, the Step 409 is repeated until the periodic timer T has been exceeded and once the periodic timer T is exceeded, processing proceeds to Step 410.

In Step 410, a determination is made on whether the charge current has exceeded a battery's permissible charge current-carrying capacity. In the case of non-aqueous secondary batteries, the charge current is usually limited to less than 0.7 CA inclusive and, when the charge current is found to have exceeded the above limit, it is determined that something wrong has happened. Therefore, a criterion of judgment as described in the above is set up in Step 410.

When the charge current is found to have exceeded the tolerable charge current-carrying capacity of a battery, the maximum on-duty ratio Dmax of pulses is set to 0.7 CA/I CHG, thereby establishing a current limit. When the charge current has not exceeded the battery's permissible charge current-carrying capacity, the maximum on-duty ratio Dmax of pulses is set to 100% in Step 412. Then, in Step 413, a determination is made on whether the battery temperature T Batt has decreased under 0° C. not inclusive.

When the battery temperature T Batt is found to have decreased under 0° C. not inclusive in Step 413, the maximum on-duty ratio Dmax of pulses is set to 0.2 CA/I CHG in Step 414, thereby establishing a further current limit. In case where the battery temperature T Batt decreases under 0° C. not inclusive with non-aqueous secondary batteries, deterioration of batteries is greatly accelerated when charging is performed at an ordinary charge current. Therefore, it is important to have criteria of judgment set up in advance for the prevention of deterioration of batteries. Although a determination is made on whether or not the battery temperature T Batt has decreased under the lower limit of 0° C. in Step 413, a determination is also made actually on whether the battery temperature T Batt has exceeded the upper limit of 65° C. or not. When the battery temperature T Batt is found to have exceeded 65° C., the maximum on-duty ratio Dmax of pulses is set to a value that is more stringent than the foregoing value of 0.2 CA/I CHG, thereby establishing an added current limit in Step 414. [Refer to FIG. 15(b)]

In Step 415, a determination is made on whether the average battery voltage $\overline{VBatt}$ exceeds the charge control voltage Vc or not. When the $\overline{VBatt}$ is found to exceed the Vc, the on-duty ratio D of pulses is decremented in Step 416 and processing proceeds to Step 418. When the $\overline{VBatt}$ does not reach the Vc, the on-duty ratio D of pulses is incremented in Step 417 and processing proceeds directly to Step 418.

In Step 418, a determination is made on whether the on-duty ratio D of pulses exceeds the maximum on-duty ratio Dmax or not.

As a result, when the on-duty ratio D of pulses is found to exceed the maximum on-duty ratio Dmax of pulses, the maximum on-duty ratio Dmax of pulses is used as the on-duty ratio D of pulses in Step 419 and processing proceeds to Step 420. On the other hand, when the on-duty ratio D of pulses does not reach the maximum on-duty ratio Dmax of pulses, processing proceeds directly to Step 420.

In Step 420, a determination is made on whether or not the product of the on-duty ratio D of pulses and the charge current, i.e., the average current has reached 0.07 CA not inclusive. When the average current is found to have reached 0.07 CA not inclusive, the charging operation is ended, thereby not raising the possibility of excessive charging and deterioration of battery through the control of the average current value. When the average current is found not to have reached 0.07 CA not inclusive, processing returns to Step 403.

Figure 12:
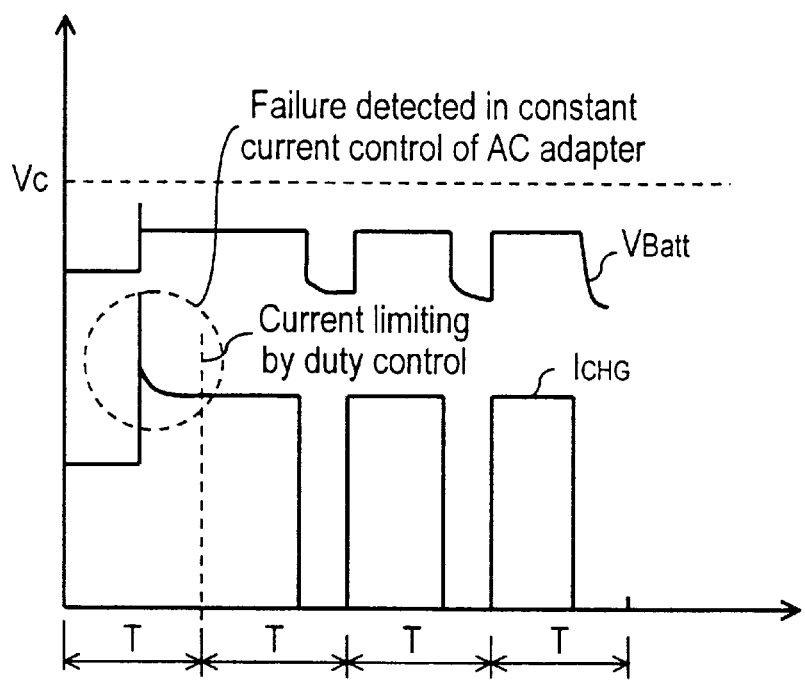
FIG. 12 is a diagram to show how a current control by duty controlling is started upon detecting that the charge current has exceeded the permissible charge current capacity of a battery due to a failure in the constant current control of an AC adapter used in a system wherein the pulse charging system in the fourth exemplary embodiment of the present invention is employed.
Figure 13:
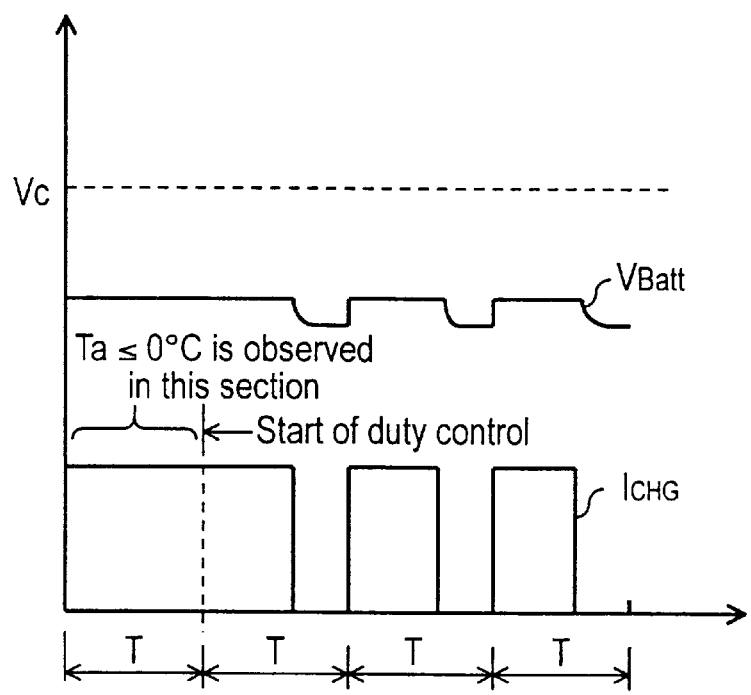
FIG. 13 is a diagram to show how a current control by duty controlling is started upon detecting that the battery temperature has become below 0° C. with the pulse charging system in the fourth exemplary embodiment of the present invention.

A charging operation takes place in the present exemplary embodiment of the present invention as described in the above. FIG. 12 and FIG. 13 show the charging operation status. FIG. 12 shows, in particular, how current limitation is initiated by a duty control when the charge current is found to have exceeded the battery's permissible charge current-carrying capacity due to a failure in a constant current control of the AC adapter 30, thereby enabling the battery and charge switch to be prevented from the destruction caused by charging with the maximum current that by far exceeds the permissible charge current-carrying capacity.

Figure 14:
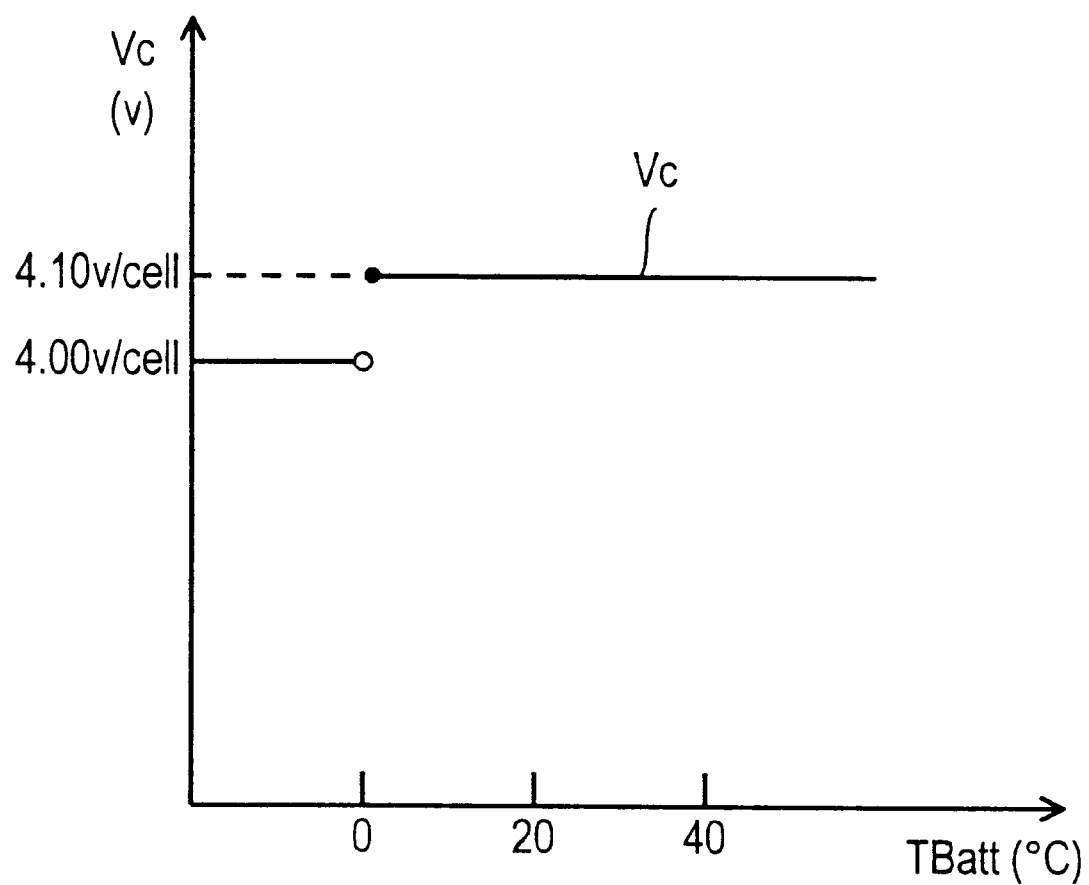
FIG. 14 is a diagram to show how an overcharge is prevented by controlling a charge control voltage Vc when charging at low temperatures is performed.

FIG. 13 shows how current limitation is initiated by a duty control when the battery temperature is found to have decreased below 0° C. while a charging operation is in progress, thereby enabling a battery to be prevented from the deterioration caused by charging with the normal current. When the battery temperature is found to have decreased below 0° C. while a charging operation is in progress, rapid deterioration of a battery caused by charging the battery at a low temperature can be also prevented by controlling the charge control voltage Vc. FIG. 14 shows the status as described in the above. As shown in FIG. 14, when the battery temperature is found to have decreased below 0° C., the charge control voltage Vc is adjusted to decrease by 0.1 V/cell.

Although an explanation is made in the foregoing only on the case where the battery temperature is decreased to a low temperature region, the same effect can be gained by the same measures as above, as a matter of course, when the battery temperature is increased to a high temperature region (higher than 65° C., for example).

Figure 15A:
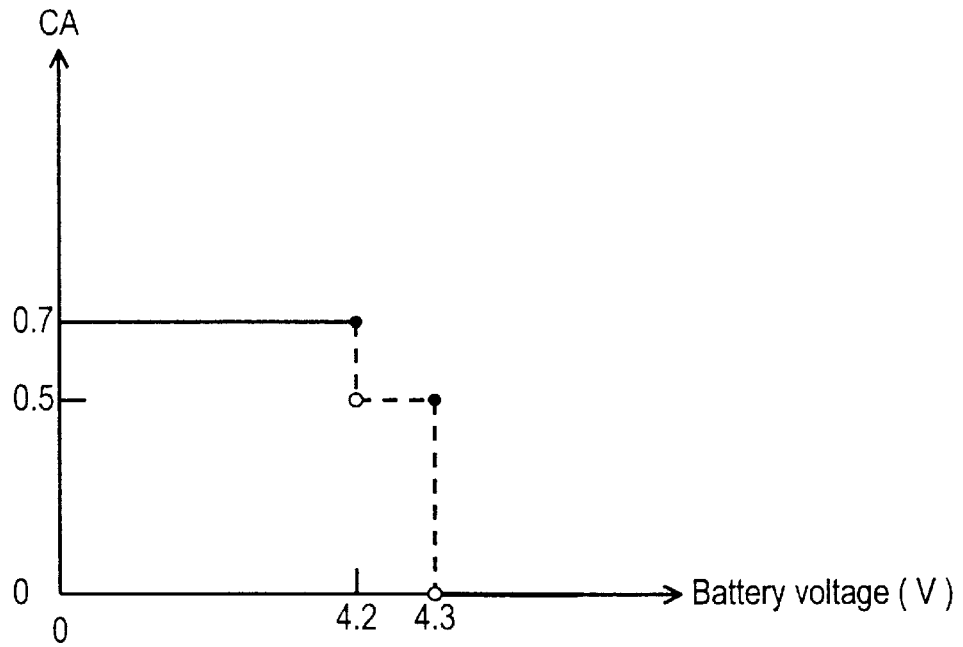
FIG. 15(a) is a diagram to show a relationship between a battery voltage as an input parameter and a permissible average current.
Figure 15B:
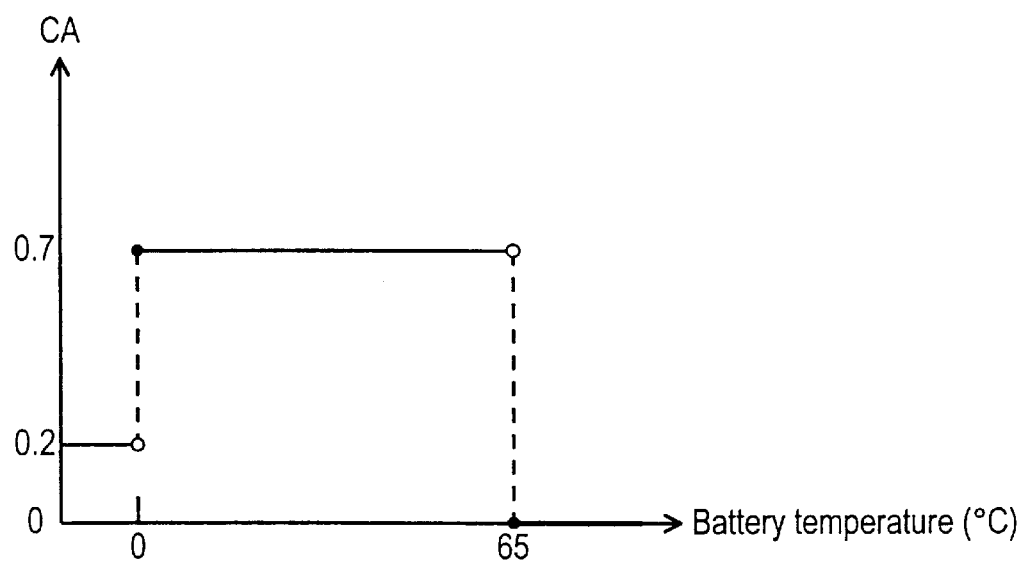
FIG. 15(b) is a diagram to show a relationship between a battery temperature as an input parameter and a permissible average current.

FIG. 15(a) and FIG. 15(b) show briefly a relationship between such input parameters as battery voltage and battery temperature and a permissible average current. These diagrams provide information that serves as a guideline for determining criteria of judgment that can be applied to Step 410, Step 414 and Step 420 in FIG. 11. When a change in the permissible average current due to a change in input parameters takes place in FIG. 15(a) and FIG. 15(b) at the same time, a lower value is to be selected for use as the permissible average current.

Figure 16:
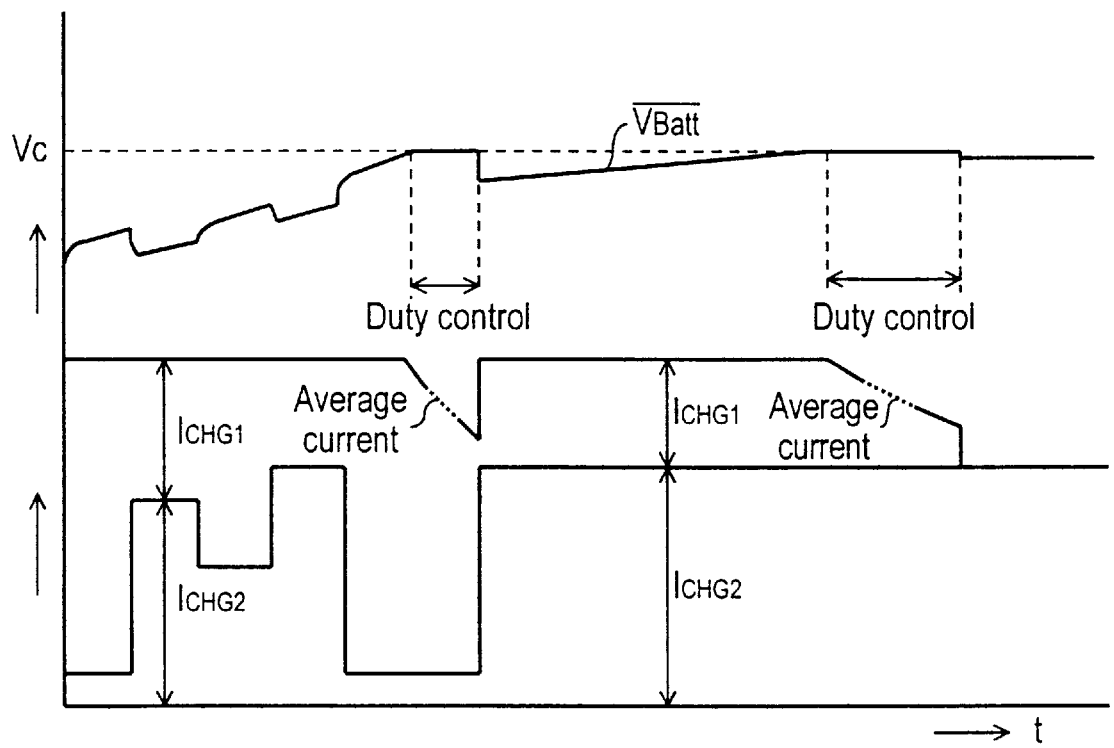
FIG. 16 is a diagram to show how a floating charge is performed.

Next, a case wherein a floating charge is performed will be explained. When a floating charge is taking place, a current I CHG2 consumed by portable equipment 20 changes widely as shown in FIG. 16 according to the operating status of the portable equipment 20. Therefore, a charge current I CHG1 to a battery pack 10 changes as the current I CHG2 changes since I CHG1 equals to I CHG−I CHG2, where I CHG is an output current of an AC adapter 30.

If charging operation is ended when an on-duty ratio D has reached a specified value (10% in this case) in the floating charge, charging tends to take place to the more excessive extent as the current I CHG2 becomes the smaller, resulting in extended charge time.

As shown in FIG. 16, constant-current charging takes place immediately after the start of charging while the on-duty ratio D of pulses being kept at 100%. When an average battery voltage $\overline{VBatt}$ of a secondary battery is exceeding the charge control voltage Vc, curbing of the current flow is started by the duty control as described in the above and when a specified average current value has been reached, the charging operation is ended. Thus, the charging operation can be brought to an end whenever the battery is charged to the same charge capacity regardless of the magnitude of the current I CHG2, thereby making it possible to prevent an over charge and to shorten charge time.

Fifth Exemplary Embodiment

Next, an explanation will be made on a pulse charge control unit which comprises a means for finding resistance of charge circuits whereby resistance of charge circuits is obtained from a difference in voltage between the voltage observed during charging and the voltage at the end of charging and a charge-current and shortens charge time by adding a voltage value determined from resistance of charge circuits and a charge current to the normal charge control voltage. A pulse charging system of the present exemplary embodiment has a specific circuit structure as shown in FIG. 2, the detailed explanation of which is omitted here. The means for finding resistance of charge circuits is to be included in a control means 51 of a pulse charge control means 5 and finds charge circuit resistance by determining the status of a switching means 1 that is controlled by the pulse charge control means 5, namely whether charging is in progress or in suspension, by checking a charge current detected in a current detecting means 4 and a battery voltage which is determined from voltage characteristics established according to the performance of a non-aqueous secondary battery to be charged or detected by a battery voltage detecting means.

Figure 17:
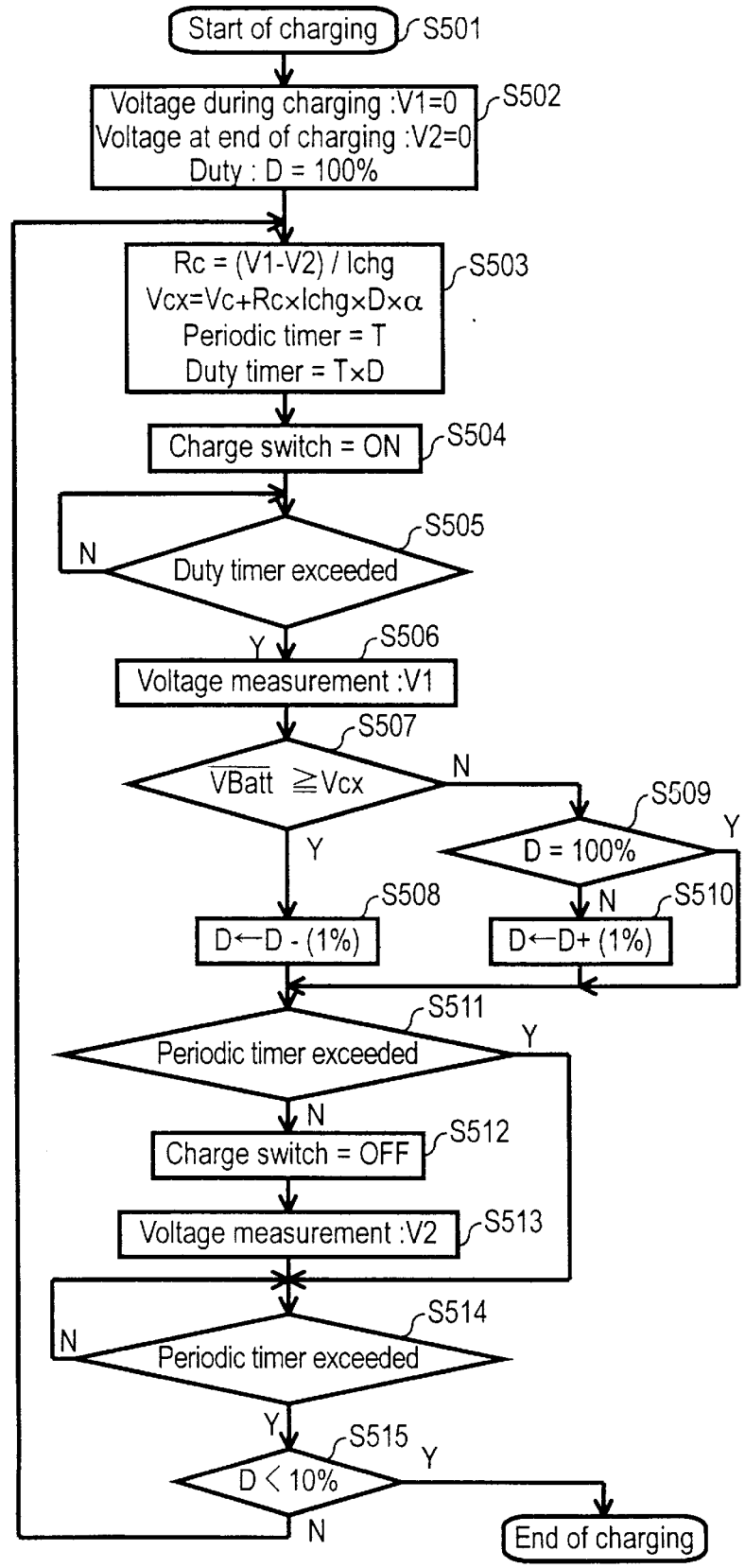
FIG. 17 is a flow chart for explaining the charging operation of a pulse charging system in a fifth exemplary embodiment of the present invention.

Next, an explanation will be made on a pulse charge control method in the present exemplary embodiment, wherein the charge circuit resistance thus obtained is incorporated in the pulse charge controlling. Fig. 17 is a flow chart for explaining the charging operation of the pulse charging system in the present exemplary embodiment. When an instruction for the start of charging is given in Step 501, a charge voltage V1 that is determined according to the performance of a non-aqueous secondary battery to be charged is set to 0, a voltage V2 at the time when charging comes to an end is set to 0 and the on-duty ratio D of pulses is set to 100% for the time to start charging in Step 502, respectively.

Then, a voltage value Vcx that is obtained from a charge control voltage Vc adjusted by the product of charge circuit resistance, which is derived by calculation from the current detected in a current detecting means 4, the charge current, the duty ratio of pulses and a safety factor a, a periodic timer T that is obtained in a periodic timer setting means 53 and a duty time T×D that is obtained in a duty timer setting means 54 are established in Step 503, respectively. It is preferred that an appropriate value between 50 ms and 2 sec is selected as the periodic timer T and a constant between 0 and 1, more preferably between 0.3 and 0.7, is selected as the safety factor a.

In Step 504, the charge switch of a switching means 1 is set to an ON position. In Step 505, this step is repeated until the set duty time T×D has been exceeded and once the duty time T×D has been exceeded, processing proceeds to Step 506. In Step 506, the charge voltage V1 is measured in a voltage detecting means 2. In Step 507, a determination is made on whether an average battery voltage $\overline{VBatt}$ exceeds the adjusted charge control voltage Vcx or not. When the average battery voltage $\overline{VBatt}$ exceeds the adjusted charge control voltage Vcx, processing proceeds to Step 508, wherein the on-duty ratio D of pulses is decremented and processing proceeds to Step 511.

When the average battery voltage $\overline{VBatt}$ does not exceed the adjusted charge control voltage Vcx, processing proceeds to Step 509, wherein a determination is made on whether the on-duty ratio D of pulses is 100% or not. When the D is found to be 100%, processing proceeds to Step 511. If the D is not 100%, processing proceeds to Step 510, wherein the on-duty ratio D of pulses is incremented and processing proceeds to Step 511.

In Step 511, a determination is made on whether the set periodic timer T is exceeded or not. If the set periodic timer T is found not to have been exceeded, processing proceeds to Step 512. If the set periodic timer T is found to have been exceeded, processing proceeds to Step 514. In Step 512, the charge switch of the switching means 1 is set to an OFF position and processing proceeds to Step 513, wherein the voltage V2 at the time when charging is stopped is measured. Then, processing proceeds to Step 514, which is repeated until the set periodic timer T has been exceeded. When the set periodic timer T has been exceeded, processing proceeds to Step 515.

In Step 515, a determination is made on whether the on-duty ratio D of pulses has reached a specified value (10% in this case) or not. When the on-duty ratio D of pulses is found to have reached the specified value, the charging operation is ended. If the on-duty ratio D of pulses is found not to have reached the specified value, processing returns to Step 503.

Figure 18:
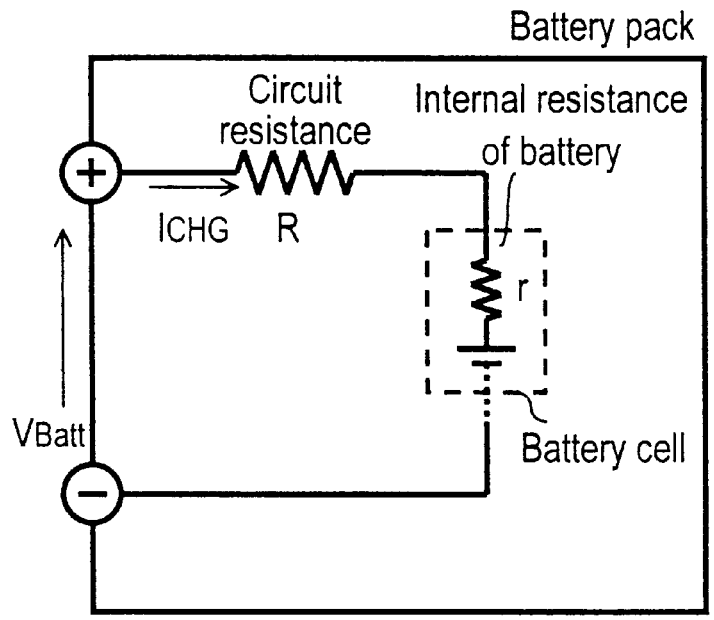
FIG. 18 shows an equivalent circuit for charge circuit resistance.
Figure 19:
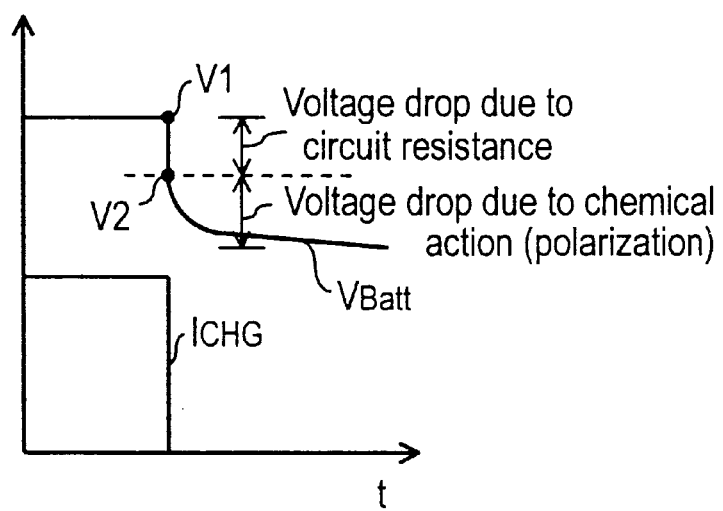
FIG. 19 is a diagram to show how a voltage drop takes place because of circuit resistance Rc and a chemical reaction occurring inside of a battery.

A charging operation takes place in the present exemplary embodiment of the present invention as described in the above. In the charging operation of the present exemplary embodiment of the present invention, the circuit resistance is obtained by calculation. As clearly known from FIG. 18, the circuit resistance is considered to be the sum of wiring resistance, resistance R of the FET switch and the like and battery's internal resistance r. How a voltage drop due to the circuit resistance Rc and another voltage drop due to the chemical action (polarization) taking place inside of a battery look like is shown in FIG. 19.

Figure 20:
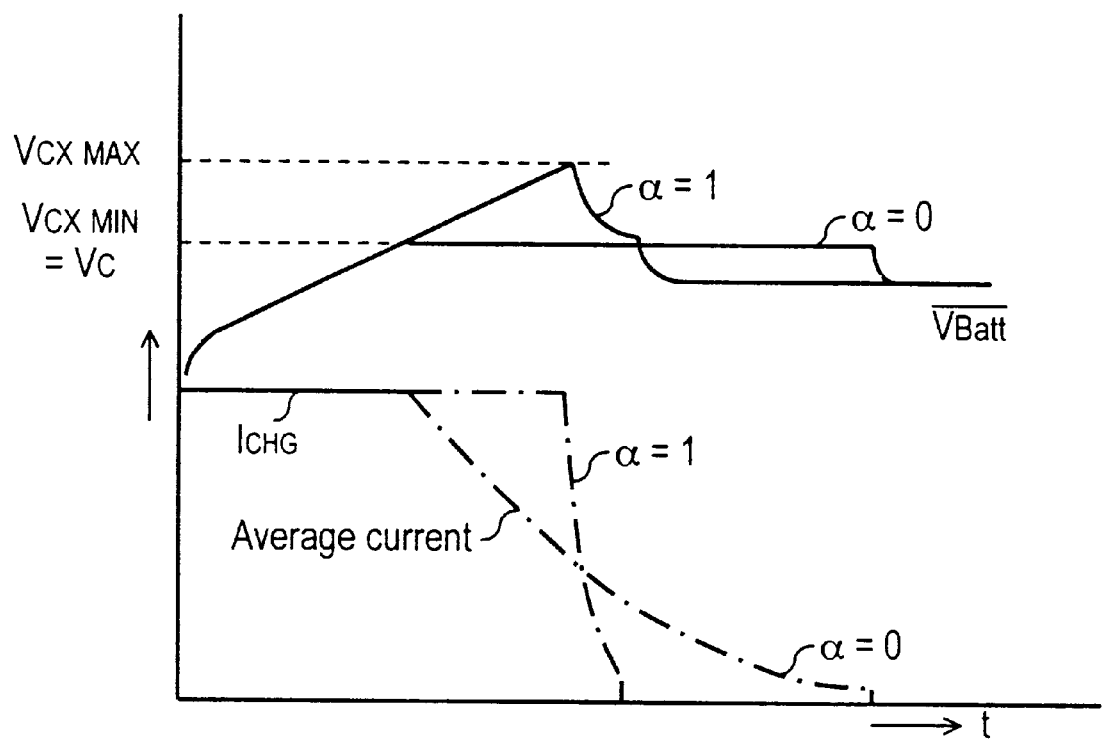

The safety factor a is considered in order to take care of the measurement accuracy involved with the circuit resistance Rc and the charge control voltage Vc is adjusted upward by the amount derived from the product of the foregoing safety factor a, circuit resistance Rc, on-duty ratio D of pulses and charge current I CHG. A relationship between the adjusted charge control voltage Vcx and the safety factor a is as shown in FIG. 20 and when the safety factor a is the closer to 1, the more rapid charging is made possible.

Since the circuit resistance Rc is obtained by calculation in the present exemplary embodiment, when the circuit resistance happens to deviate from a specified range, for instance, it can be duly considered that some failures have occurred in battery cells or circuit components. As soon as such failures are detected, the charging operation is stopped and that information is outputted, thereby securing the reliability of the charge control system. The circuit resistance Rc is measured periodically or as it is deemed necessary while the charging operation taking place and the information on the circuit resistance Rc is updated accordingly.

Sixth Exemplary Embodiment

Figure 21:
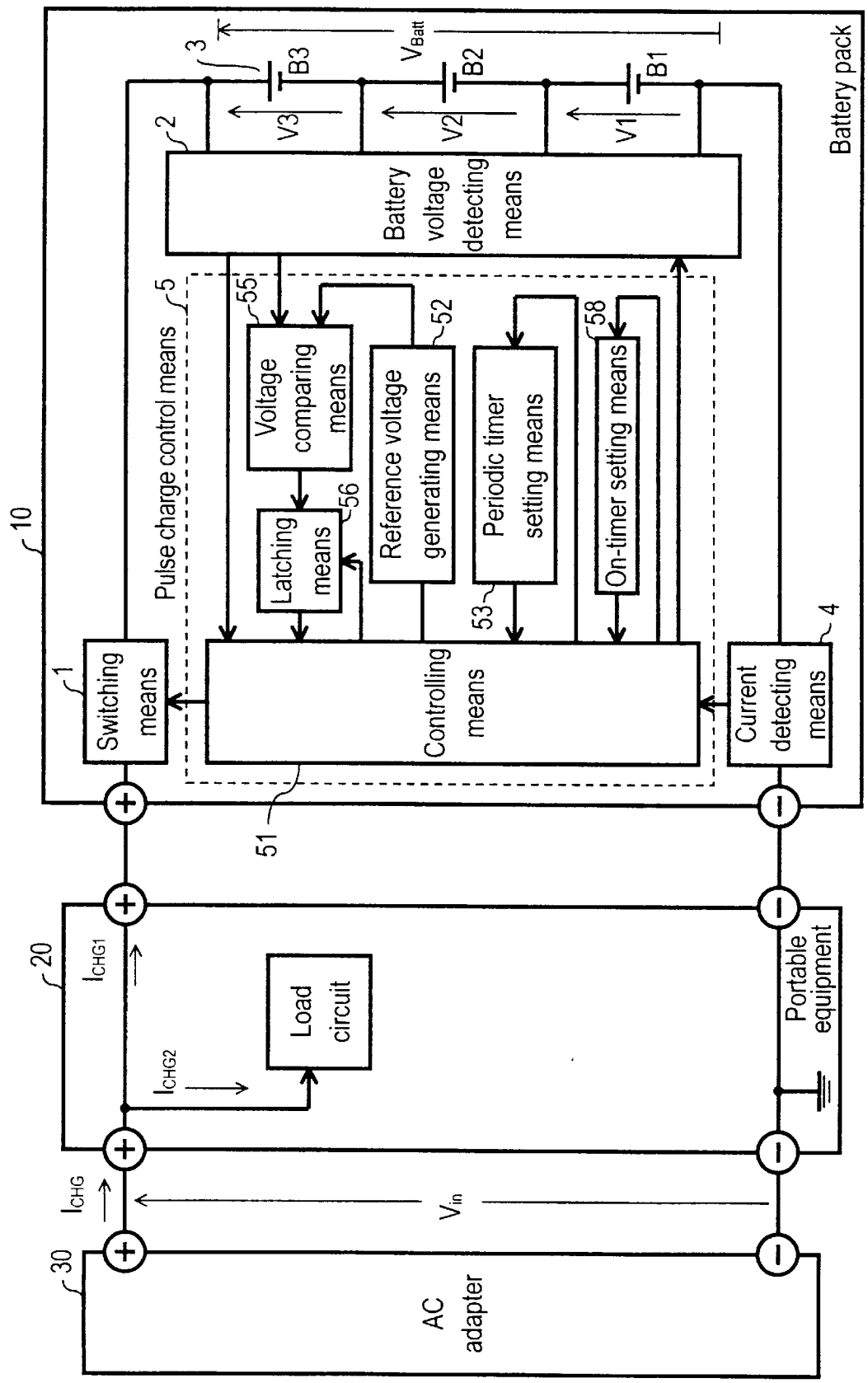
FIG. 21 is a block diagram including details of a pulse charging system in a sixth exemplary embodiment of the present invention.

A pulse charge control unit in the present exemplary embodiment is characterized by employing a charging method whereby periods of pulses are changed instead of the on-duty ratio of pulses that was changed in the charging methods in all the foregoing exemplary embodiments. When an average battery voltage $\overline{VBatt}$ has exceeded a charge control voltage Vc during a specified charge pulse period in the pulse charging method with pulse periods changed, a next specified charge pulse period is adjusted to increase and, when the average battery voltage $\overline{VBatt}$ has not reached the charge control voltage Vc during the specified charge pulse period, the next specified charge pulse period is adjusted to decrease and also, when the next specified charge pulse period has become larger than a specified value, the pulse charging operation is brought to an end. FIG. 21 is a block diagram including details of a pulse charging system in the present exemplary embodiment.

As shown in FIG. 21, a pulse charge control unit comprises a switching means 1, a battery voltage detecting means 2, a current detecting means 4 and a pulse charge control means 5 in the same way as shown in FIG. 2. The pulse charge control means 5 for controlling pulse charging comprises in the same way as the pulse charge control means in foregoing respective exemplary embodiments a means for increasing/decreasing charge pulse period and a means for determining end of pulse charging and further a control means 51 for controlling each respective means that is described below, a reference voltage generating means 52 for generating a reference voltage that serves as a charge control voltage, a periodic timer setting means 53 for fixing a charge pulse period, a voltage comparing means 55, wherein a battery voltage V Batt produced by accumulating each respective cell voltage (V1, V2, V3) obtained from the battery voltage detecting means 2 is memorized and an average battery voltage $\overline{VBatt}$ obtained during a specified period is compared with the reference voltage of the reference voltage generating means 52, a latching means 56 for latching that the average battery voltage $\overline{VBatt}$ has exceeded the charge control voltage Vc and an on-timer setting means 58 for setting up pulse current on-time instead of a duty timer setting means for setting up an on-duty ratio. It is needless to say that the realization of these various means as described in the above is made possible by the use of microcomputers in the same way as in the foregoing respective exemplary embodiments.

Figure 22:
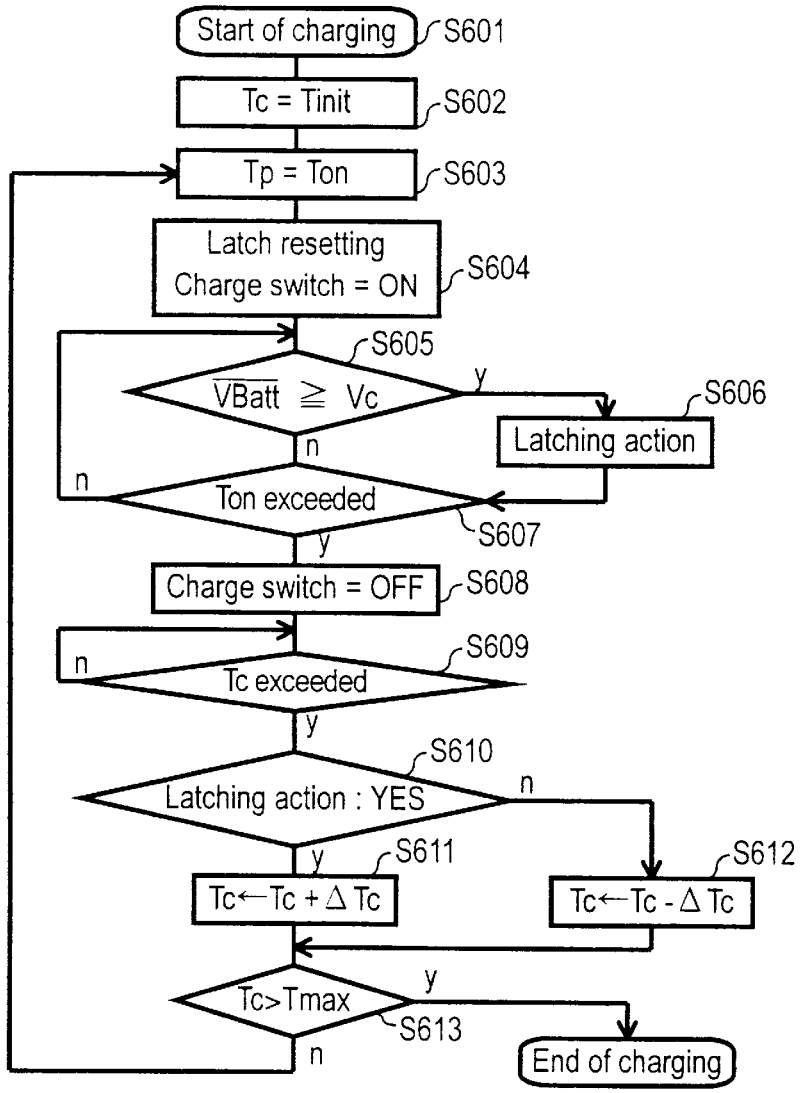
FIG. 22 is a flow chart for explaining the charging operation of the pulse charging system in the sixth exemplary embodiment of the present invention.

FIG. 22 is a flow chart for explaining the charging operation of the pulse charging system in a sixth exemplary embodiment of the present invention. When an instruction for the start of charging is given in Step 601, an initial value of charge pulse period Tc=T init is set up in the periodic timer setting means 53 at the time of charge start in Step 602 and a pulse current on-time Tp=Ton (constant) is set up in the on-timer setting means 58 in Step 603. The initial values of these timer setting means can be set up arbitrarily.

After the latch of the latching means 56 has been reset in Step 604, the charge switch of the switching means 1 is set to an ON position. When the average battery voltage $\overline{VBatt}$ of a secondary battery is found to have exceeded the charge control voltage Vc in Step 605, processing proceeds to Step 607 after the latch of the latching means 56 has been set in Step 606 and when the $\overline{VBatt}$ is found not to have reached the Vc, processing proceeds to 607 directly.

In Step 607, a determination is made on whether the pulse current on-time Tp has exceeded the Ton set up in the on-timer setting means 58 or not, and when the on-time Ton is found not to have been exceeded, processing returns to Step 605 again and the charging operation continues. When the on-time Ton is found to have been exceeded, processing proceeds to Step 608, wherein the charge switch is set to an OFF position by the switching means 1. In Step 609, the process of determining whether the charge pulse period To set up in Step 602 is exceeded or not is repeated and when the set charge pulse period Tc is found to have been exceeded, processing proceeds to Step 610.

In Step 610, a determination is made on whether the latch of the latching means 56 is set or not. When the latch of the latching means 56 is found to have been set, processing proceeds to Step 611, wherein a specified periodic increment or decrement Δ Tc is added to the set value Tc of the periodic timer setting means 53 and then processing proceeds to Step 613. When the latch of the latching means 56 is found not to have been set, processing proceeds to Step 612, wherein the set value Tc of the periodic timer setting means is reduced by the specified periodic increment or decrement Δ Tc and then processing proceeds to Step 613. At this time, an arrangement has to be made, as a matter of course, to have an inequality of Tc≧Ton established all the time.

In Step 613, a determination is made on whether the charge pulse period Tc exceeds a specified value Tmax or not. When the charge pulse period Tc is found to have exceeded the specified value Tmax, the charging operation is ended. However, when the charge pulse period Tc is found not to have exceeded the specified value Tmax, processing returns to Step 603 and repeats the steps from Step 603 to Step 613.

Figure 23:
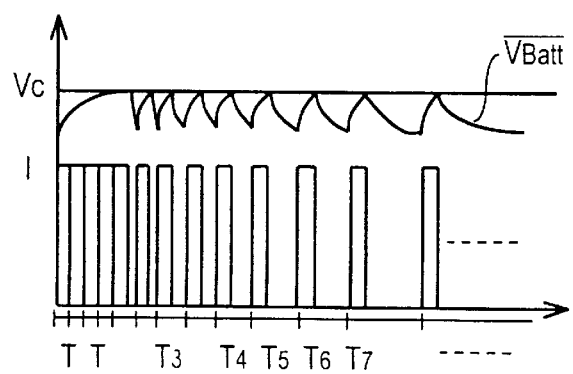
FIG. 23 is a diagram to show the charging operation status of the pulse charging system in the sixth exemplary embodiment of the present invention.
Figure 24:
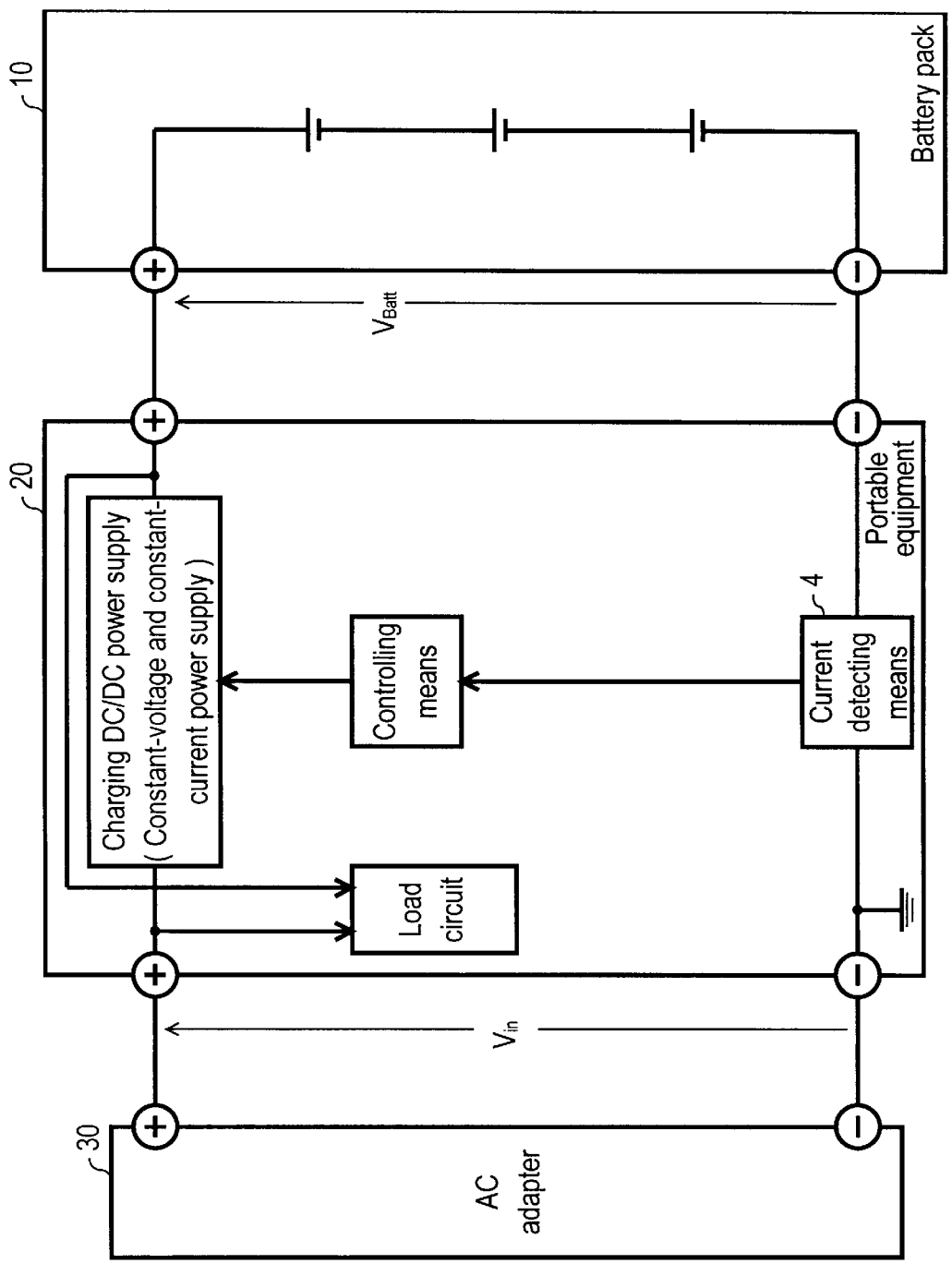
FIG. 24 is a diagrammatic sketch to show how a prior art charging system is used in electronic equipment.
Figure 25:
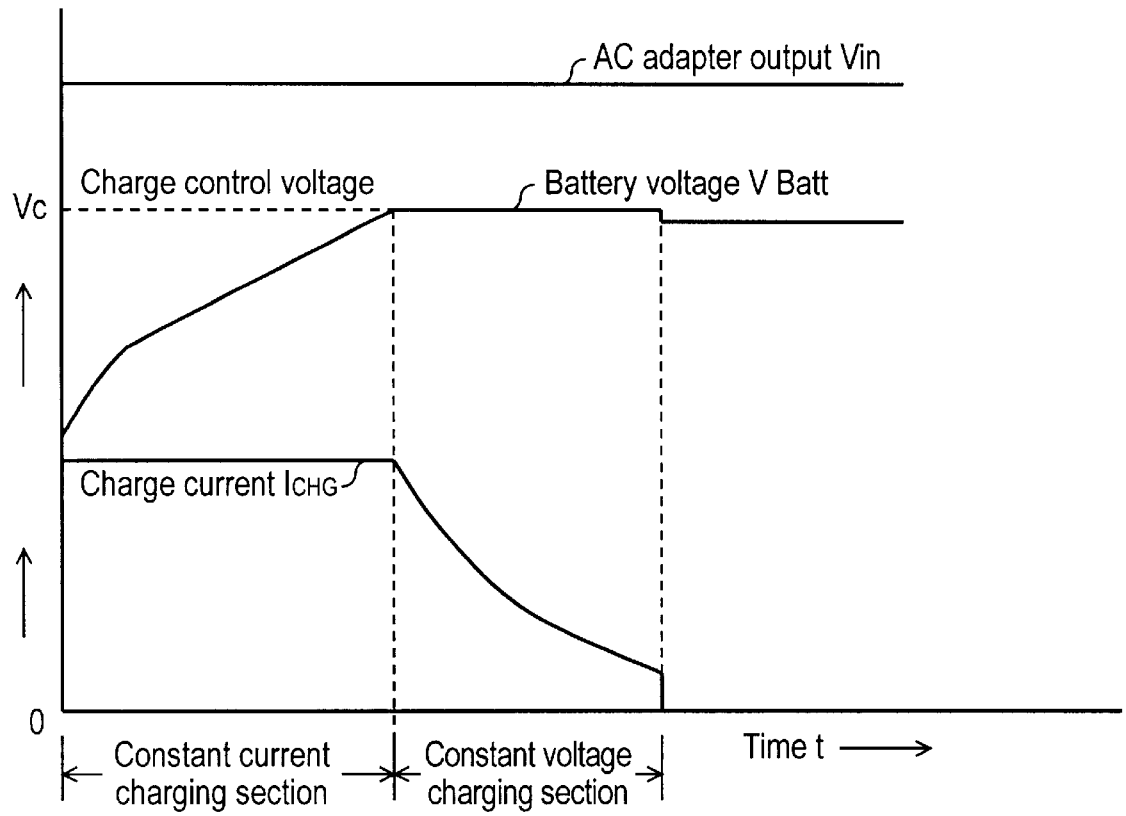
FIG. 25 is a diagram to show the charging operation status of the prior art charging system.

FIG. 23 shows how the charging in the sixth exemplary embodiment is performed. As shown clearly in FIG. 23, when a relationship of Tinit=Ton is established in the beginning of charging, the status of Tc (charge pulse period)=Ton (on-timer setting time) is maintained immediately after the start of charging, thereby a constant current charging operation taking place in effect. Immediately after the time when the average battery voltage $\overline{VBatt}$ of a secondary battery is found to have exceeded the charge control voltage Vc, the charge pulse period starts to increase and when the charge pulse period Tc has exceeded a specified value Tmax the charging operation is ended.

According to the charging method in the present exemplary embodiment, the pulse current on-time Tp, during which charging is actually taking place, is fixed but when an inequality of $\overline{VBatt}$≧Vc is found satisfied the charge pulse period Tc increases gradually with a resulting reduction in the relative charge current.

INDUSTRIAL APPLICABILITY

As described in the above, a pulse charging method of the present invention relies on a pulse charge control method all the way from the beginning to the end of charging and the charging operation is performed by determining during a specified charge period an on-duty ratio of pulses for a next specified charge period. According to a pulse charging system to perform charging by the foregoing pulse charging method as described in a first exemplary embodiment, such an excellent effect as providing a pulse charging system for non-aqueous secondary batteries, which has a low cost, no heat generation and capabilities of shortening charge time since pulse charging is employed all the way from the beginning of charging, can be achieved. Furthermore, since an arrangement has been made to measure each respective battery cell voltage, over-charge can be prevented on an each respective cell basis.

As a pulse period T is made the shorter or an on-duty ratio is the more finely decremented or incremented, charge characteristics can be made the closer to the ones that have been conventionally known, thereby holding superiority as a pulse charging system.

A pulse charging system of the present invention is contained inside of a battery pack 10, thereby allowing the battery voltage V Batt to be detected directly. Therefore, the time spent in a constant voltage section (a pulse charge section, in effect) is shortened. As a result, a reduction in charge time is made possible, thus achieving an excellent effect of providing a pulse charging system for non-aqueous secondary batteries that can have the pulse charging system contained inside of a battery pack.

According to a pulse charging system as described in a second exemplary embodiment, such an excellent effect can be achieved as providing a pulse charging system for non-aqueous secondary batteries, wherein charging is started by having an on-duty ratio D for the start of charging set to the vicinity of 0% and, when a battery that have been finished with charging once before is recharged, the charging operation is ended quickly.

In addition, an arrangement is made to allow a battery voltage V Batt to be detected in a more straightforward manner with a resulting reduction in the time spent in a constant voltage section (a pulse charging section, in effect), thereby achieving an excellent effect of providing a battery pack whereby charge time can be shortened.

With a pulse charging system as described in a third exemplary embodiment, a voltage comparison is performed by a voltage comparing means according to a lapse of the duty time set up by a duty timer setting means. Therefore, a latch means can be eliminated from a pulse charge control means with a resulting reduction in cost.

With a pulse charging system as described in a fourth exemplary embodiment, an arrangement is made to limit an average current to cope with failures and the like in addition to the foregoing features, thereby enabling an effect of preventing battery's deterioration due to an excessive charge current to be gained. Furthermore, when a floating charge is conducted, an effect of providing a pulse charging system for non-aqueous secondary batteries that is not likely to have any over-charge and shortens charge time can be gained.

On the other hand, a pulse charging system as described in a fifth exemplary embodiment can achieve a unique effect of allowing charge time to be shortened by adding a voltage value determined from charge circuit resistance and charge current to a usual charge control voltage.

Further, with a pulse charging system as described in a sixth exemplary embodiment, the same effect as seen in the first exemplary embodiment can be gained.

We claim:

1. A pulse charging method for charging by determining an on-duty ratio of pulses for a next specified charge period during a specified charge period after the start of charging, characterized by having the on-duty ratio of pulses for the next specified charge period reduced when an average battery voltage has exceeded a charge control voltage during the specified charge period, having the on-duty ratio of pulses for the next specified charge period increased when the average battery voltage has not exceeded the charge control voltage during the specified charge period and having the pulse charging ended when the on-duty ratio of pulses has reached a specified value in the next specified charge period.

2. A pulse charging system for charging by determining an on-duty ratio of pulses for a next specified charge period during a specified charge period after the start of charging, comprising:
    a duty ratio reducing means for having an on-duty ratio of pulses for a next specified charge period reduced when an average battery voltage has exceeded a charge control voltage during a specified charge period;
    a duty ratio increasing means for having an on-duty ratio of pulses for a next specified charge period increased when an average battery voltage has not exceeded a charge control voltage during a specified charge period; and
    a means for determining pulse charge ending for having the pulse charging ended when an on-duty ratio of pulses has reached a specified value in a next specified charge period.

3. The pulse charging system according to claim 2, wherein said duty ratio reducing means, duty ratio increasing means and means for determining pulse charge ending are contained inside of a battery pack.

4. A pulse charging system for having the pulse charging ended when an on-duty ratio of pulses has reached a specified value, comprising:
    a switching means for turning on/off a charge current;
    a battery voltage detecting means for detecting a voltage of each respective battery cell; and
    a pulse charge control means for performing an overall control over pulse charging, with said pulse charge control means further comprising:
        a reference voltage generating means for generating a charge control voltage as a reference voltage;
        a voltage comparing means for conducting a comparison between an average battery voltage obtained during a specified period from a battery voltage that has accumulated each respective cell voltage detected by said battery voltage detecting means and the reference voltage generated by said reference voltage generating means;
        a periodic timer setting means for setting a charge period;
        a duty timer setting means for setting duty time that is determined by the product of a specified charge period and a duty ratio;
        a latching means for latching that an average battery voltage is found to have exceeded a charge control voltage after comparing voltages in said voltage comparing means; and
        a control means for controlling said each respective means.

5. A pulse charging system for charging by setting an on-duty ratio of pulses for a charge period to a maximum value at the start of charging and by determining an on-duty ratio of pulses for a next specified charge period during a specified charge period after the start of charging, comprising:
    a latching means for latching that an average battery voltage has exceeded a charge control voltage during a specified charge period;
    a duty ratio reducing means for having an on-duty ratio of pulses reduced in a next specified charge period on a condition that said latching means is in a latching state when an average battery voltage has exceeded a charge control voltage during a specified charge period;
    a duty ratio increasing means for having an on-duty ratio of pulses increased in a next specified charge period when an average battery voltage has not exceeded a charge control voltage during a specified charge period; and
    a means for determining pulse charge ending for having the pulse charging ended when an on-duty ratio of pulses has reached a specified value in a next specified charge period.

6. A pulse charging system for charging by setting an on-duty ratio of pulses for a charge period to a minimum value at the start of charging and by determining an on-duty ratio of pulses for a next specified charge period during a specified charge period after the start of charging, comprising:
    a latching means for latching that an average battery voltage has exceeded a charge control voltage during a specified charge period;
    a duty ratio reducing means for having an on-duty ratio of pulses reduced in a next specified charge period on a condition that said latching means is in a latching state when an average battery voltage has exceeded a charge control voltage during a specified charge period;
    a duty ratio increasing means for having an on-duty ratio of pulses increased in a next specified charge period when an average battery voltage has not exceeded a charge control voltage during a specified charge period; and
    a means for determining pulse charge ending for having the pulse charging ended when an on-duty ratio of pulses has reached a specified value in a next specified charge period.

7. A pulse charging system for having the pulse charging ended when an on-duty ratio of pulses has reached a specified value, comprising:
    a switching means for turning on/off a charge current;
    a battery voltage detecting means for detecting a voltage of each respective battery cell; and
    a pulse charge control means for performing an overall control over pulse charging, with said pulse charge control means further comprising:

a control means for controlling individually each respective means as described below;

a reference voltage generating means for generating a reference voltage that serves as a charge control voltage according to said control means;

a voltage comparing means for conducting a comparison between an average battery voltage obtained during a specified period from a battery voltage that has accumulated each respective cell voltage detected by said battery voltage detecting means and the reference voltage generated by said reference voltage generating means;

a periodic timer setting means for setting a specified charge period; and a duty timer setting means for setting duty time that is determined by the product of a specified charge period and a duty ratio, wherein said pulse charge control means performs a voltage comparison by said voltage comparison means according to said excessive duty time set in said duty timer setting means.

8. A pulse charging system for charging by determining an on-duty ratio of pulses for a next specified charge period during a specified charge period after the start of charging, comprising:

a voltage detecting means for detecting a voltage of each respective cell;

a temperature detecting means for determining a battery temperature by detecting a temperature of each respective cell;

a maximum duty ratio setting means for setting a maximum duty ratio to a value obtained by dividing a first specified average current determined by said voltage detecting means and temperature detecting means with a charge current at that time when the charge current exceeds said first specified average current;

a voltage comparing means for conducting a comparison between an average battery voltage obtained during a specified period from a battery voltage that has accumulated each respective cell voltage detected by said battery voltage detecting means and a charge control voltage;

a duty ratio reducing means for having an on-duty ratio of pulses reduced in a next specified charge period when an average battery voltage has exceeded a charge control voltage during a specified charge period;

a duty ratio increasing means for having an on-duty ratio of pulses increased in a next specified charge period when an average battery voltage has not exceeded a charge control voltage during a specified charge period; and a means for determining pulse charge ending for having the pulse charging ended when an average current in a next specified charge period has reached a second average current that is smaller than said first specified average current.

9. A pulse charging system for charging by determining an on-duty ratio of pulses for a next specified charge period during a specified charge period after the start of charging, comprising:

a means for finding charge circuit resistance from a voltage obtained by subtracting the voltage at the end of charging from the voltage during charging and a charge current;

a means for adjusting a charge control voltage by adding to a fixed charge control voltage a value derived from the product of charge circuit resistance obtained by said means for finding charge circuit resistance, a charge current, an on-duty ratio of pulses and a safety factor that is a constant between 0 and 1 and determined by the measurement accuracy of the charge circuit resistance;

a duty ratio reducing means for reducing an on-duty ratio of pulses in a next specified charge period when an average battery voltage has exceeded an adjusted charge control voltage during a specified charge period;

a duty ratio increasing means for increasing an on-duty ratio of pulses in a next specified charge period when an average battery voltage has not exceeded an adjusted charge control voltage during a specified charge period; and a means for determining pulse charge ending for having the pulse charging ended when an on-duty ratio of pulses has reached a specified value in a next specified charge period.

10. The pulse charging system according to claim 9, wherein the voltage at the end of charging used in finding the charge circuit resistance in said means for finding charge circuit resistance is obtained within a time immediately before a voltage drop due to a chemical action in a battery takes place.

11. The pulse charging system according to claim 9, wherein the safety factor for use in said means for adjusting a charge control voltage is a constant between 0.3 and 0.7.

12. A pulse charging method for charging by determining a next specified charge pulse period during a specified charge pulse period after the start of charging, characterized by having the next specified charge pulse period increased when an average battery voltage has exceeded a charge control voltage during the specified charge pulse period, having the next specified charge period maintained or reduced when the average battery voltage has not exceeded the charge control voltage during the specified charge pulse period and having the pulse charging ended when the next specified charge pulse period has reached a specified value.

13. A pulse charging system for charging by determining a next specified charge pulse period during a specified charge pulse period after the start of charging, comprising:

charge pulse period increasing means for having a next specified charge pulse period increased when an average battery voltage has exceeded a charge control voltage during said specified charge pulse period;

charge pulse period reducing means for having said next specified charge period maintained or reduced when said average battery voltage has not exceeded said charge control voltage age during said specified charge pulse period; and means for determining pulse charge ending for having the pulse charging ended when said next specified charge pulse period has exceeded a specified value.

14. The pulse charging system according to claim 13, wherein the charge pulse period increasing means, charge pulse period reducing means and means for determining pulse charge ending are contained in a battery pack.

15. The pulse charging system according to claim 13, further comprising latching means for latching when an average battery voltage has exceeded said charge control voltage during said specified charge pulse period, wherein said next specified charge pulse period is increased provided that said latching means is latching and said next specified charge pulse period is maintained or reduced provided that said latching means is not latching.

16. A pulse charging system for charging by determining a next specified charge pulse period during a specified charge pulse period after the start of charging and having the pulse charging ended when a pulse charge period has exceeded a specified value, comprising:

- a switching means for turning on/off a charge current;
- a battery voltage detecting means for detecting a voltage of each respective battery cell; and
- a pulse charge control means for performing an overall control over pulse charging, with said pulse charge control means further comprising:
  - a reference voltage generating means for generating a charge control voltage as a reference voltage;
  - a voltage comparing means for conducting a comparison between an average battery voltage obtained during a specified period from a battery voltage that has accumulated each respective cell voltage detected by said battery voltage detecting means and the reference voltage generated by said reference voltage generating means;
  - a periodic timer setting means for setting a charge period;
  - an on-timer setting means for setting a pulse current on-time;
  - a latching means for latching that an average battery voltage is found to have exceeded a charge control voltage after comparing voltages in said voltage comparing means; and
  - a control means for controlling said each respective means.

* * * * *